(12) United States Patent
Liao et al.

(10) Patent No.: US 8,205,200 B2
(45) Date of Patent: Jun. 19, 2012

(54) COMPILER-BASED SCHEDULING OPTIMIZATION HINTS FOR USER-LEVEL THREADS

(75) Inventors: Shih-wei Liao, San Jose, CA (US); Ryan N. Rakvic, Palo Alto, CA (US); Richard A. Hankins, San Jose, CA (US); Hong Wang, Fremont, CA (US); Gansha Wu, Beijing (CN); Guei-Yuan Lueh, San Jose, CA (US); Xinmin Tian, Union City, CA (US); Paul M. Petersen, Champaign, IL (US); Sanjiv Shah, Champaign, IL (US); Trung Diep, San Jose, CA (US); John Shen, San Jose, CA (US); Gautham Chinya, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1245 days.

(21) Appl. No.: 11/289,803

(22) Filed: Nov. 29, 2005

(65) Prior Publication Data
US 2007/0124732 A1    May 31, 2007

(51) Int. Cl.
 *G06F 9/44* (2006.01)
 *G06F 9/46* (2006.01)
(52) U.S. Cl. .................. 718/102; 718/103; 712/220
(58) Field of Classification Search .................... 718/103
 See application file for complete search history.

(56) References Cited

U.S. PATENT DOCUMENTS

| | | | |
|---|---|---|---|
| 5,812,811 A * | 9/1998 | Dubey et al. | 712/216 |
| 6,247,121 B1 * | 6/2001 | Akkary et al. | 712/239 |
| 6,269,390 B1 * | 7/2001 | Boland | 718/100 |
| 6,353,882 B1 * | 3/2002 | Hunt | 712/239 |
| 6,766,515 B1 * | 7/2004 | Bitar et al. | 718/100 |
| 6,826,752 B1 * | 11/2004 | Thornley et al. | 718/100 |
| 7,373,640 B1 * | 5/2008 | English et al. | 717/149 |
| 2003/0018691 A1 * | 1/2003 | Bono | 709/106 |
| 2004/0123280 A1 * | 6/2004 | Doshi et al. | 717/161 |

(Continued)

FOREIGN PATENT DOCUMENTS
WO    2007/064490 A1    6/2007

OTHER PUBLICATIONS

Eleftherios D. Polychronopoulos, Theodore S. Papatheodorou; "Scheduling User-Level Threads on Distributed Shared-Memory Mul tiprocessors"; Lecture Notes I N Computer Science, vol. 1685, 1999, pp. 358-368.*

(Continued)

*Primary Examiner* — Qing Wu
(74) *Attorney, Agent, or Firm* — Blakely, Sokoloff, Taylor & Zafman LLP

(57) ABSTRACT

Method, apparatus and system embodiments to schedule user-level OS-independent "shreds" without intervention of an operating system. For at least one embodiment, the shred is scheduled for execution by a scheduler routine rather than the operating system. The scheduler routine may receive compiler-generated hints from a compiler. The compiler hints may be generated by the compiler without user-provided pragmas, and may be passed to the scheduler routine via an API-like interface. The interface may include a scheduling hint data structure that is maintained by the compiler. Other embodiments are also described and claimed.

24 Claims, 9 Drawing Sheets

U.S. PATENT DOCUMENTS

| | | | |
|---|---|---|---|
| 2004/0128490 A1* | 7/2004 | Wilkerson et al. | 712/240 |
| 2007/0006167 A1* | 1/2007 | Luk et al. | 717/130 |
| 2007/0088915 A1* | 4/2007 | Archambault et al. | 711/137 |

OTHER PUBLICATIONS

Eleftherios D. Polychronopoulos, Xavier Martorell, Dimitrios S. Nikolopoulos, Jesus Labarta, Theodore S. Papatheodorou, et al.; "Kernel-level scheduling for the nano-threads programming model"; Proceedings of the 12th International Conference on Supercomputing, 1998, pp. 337-344.*

Rosing, Matt; "A programmable preprocessor for parallelizing Fortran-90"; Proceedings of the 1999 ACM/IEEE conference on Supercomputing; Portland, Oregon, United States; Article No. 3; Year of Publication: 1999.*

Eduard Ayguadé, Xavier Martorell, Jesés Labarta, Marc Gonález and Nacho Navarro; "Exploiting parallelism through directives on the nano-threads programming model"; Languages and Compilers for Parallel Computing; vol. 1366/1998; pp. 307-321; Year of Publication: 1998.*

Dimitrios S. Nikolopoulos, Theodore S. Papatheodorou, Constantine D. Polychronopoulos, Jesus Labarta, Eduard Ayguade; "A Transparent Runtime Data Distribution Engine for OpenMP"; Scientic Programming; May 2001.*

OpenMP Program Application Interface, Ver. 2.5, May 2005.

Dean, A. Compiling for Concurrency: Planning and Performing Software Thread Integration. 23rd IEEE Real-Time Systems Symposium, Dec. 3-5, 2002, Austin, TX.

U.S. Appl. No. 11/235,865, filed Sep. 26, 2005.

"Basic Thread Operations" for POSIX Threads, http://www.gnu.org/software/libc/manual/html_node/Basic-Thread-Operations.html#Basic%20Thread%20Operations.

A. Sun F, Ravi S, Raghunathan A., Jha N. Application-specific Heterogeneous Multiprocessor Synthesis using Extensible Processors.

U.S. Appl. No. 11/027,445, filed Dec. 30, 2004.

Barekas et al., "Nanothreads vs. Fibers for the Support of Fine Grain Parallelism on Windows NT/2000 Platforms", Lecture Notes in Computer Science, 2000, vol. 1940, pp. 146-159.

Anderson et al., "Scheduler Activations: Effective Kernel Support for the User-Level Management of Parallelism", ACM Transactions on Computer Systems, New York, US, Feb. 1992, pp. 53-79.

Koppe, Christoph, "Sleeping threads: A kernel Mechanism for Support of Efficient User Level Threads", Seventh IASTED-ISMM International Conference on Parallel and Distributed Computing Systems, Washington D.C., Oct. 18-21, 1995, pp. 11-15.

International Search Report and Written Opinion for PCT Patent Application No. PCT/US2006/044587, mailed on Apr. 13, 2007, 11 pages.

International Preliminary Report on Patentability for PCT Patent Application No. PCT/US2006/044587, mailed on Jun. 12, 2008, 8 pages.

Office Action for Chinese Patent Application No. 2006800444716, mailed on Jun. 17, 2010, 19 pages of Chinese Office Action, including 12 pages of English translation.

* cited by examiner

COMPILER-BASED SCHEDULING OPTIMIZATION HINTS FOR USER-LEVEL THREADS

BACKGROUND

1. Technical Field

The present disclosure relates generally to information processing systems and, more specifically, to improved efficiency for scheduling of user-level threads that are not scheduled by an operating system.

2. Background Art

An approach that has been employed to improve processor performance is known as "multithreading." In software multithreading, an instruction stream may be divided into multiple instruction streams that can be executed in parallel. Alternatively, multiple independent software streams may be executed in parallel.

In one approach, known as time-slice multithreading or time-multiplex ("TMUX") multithreading, a single processor switches between threads after a fixed period of time. In still another approach, a single processor switches between threads upon occurrence of a trigger event, such as a long latency cache miss. In this latter approach, known as switch-on-event multithreading ("SoEMT"), only one thread, at most, is active at a given time.

Increasingly, multithreading is supported in hardware. For instance, in one approach, processors in a multi-processor system, such as a chip multiprocessor ("CMP") system, may each act on one of the multiple software threads concurrently. In another approach, referred to as simultaneous multithreading ("SMT"), a single physical processor is made to appear as multiple logical processors to operating systems and user programs. For SMT, multiple software threads can be active and execute simultaneously on the single physical processor without switching. That is, each logical processor maintains a complete set of the architecture state, but many other resources of the physical processor, such as caches, execution units, branch predictors, control logic and buses are shared. For SMT, the instructions from multiple software threads, each on a distinct logical processor, execute concurrently.

For a system that supports concurrent execution of software threads, such as SMT and/or CMP systems, an operating system application may control scheduling and execution of the software threads. Typically, however, operating system control does not scale well; the ability of an operating system application to schedule threads without negatively impacting performance is commonly limited to a relatively small number of threads. Accordingly, a system may be implemented such that user-level threads are scheduled by a program in the user space rather than being scheduled by an operating system. One such system is discussed in co-pending application U.S. Ser. No. 11/235,865, filed Sep. 26, 2005.

BRIEF DESCRIPTION OF THE DRAWINGS

Embodiments of the present invention may be understood with reference to the following drawings in which like elements are indicated by like numbers. These drawings are not intended to be limiting but are instead provided to illustrate selected embodiments of a computer-accessible medium, system and methods to judiciously schedule user-level threads in a multithreaded system based, at least in part, on scheduling hints from a compiler.

DETAILED DESCRIPTION

The following discussion describes selected embodiments of methods, systems and articles of manufacture to improve efficiency of scheduling for multiple concurrently-executed user-level threads of execution (sometimes referred to herein as "shreds") that are not created or scheduled by the operating system. The shreds are instead scheduled by a scheduler routine that can dynamically adapt shred scheduling based on information provided, at least in part, by a compiler. The compiler-provided information is in the nature of a hint, which may be disregarded by the scheduler without impacting program correctness. Such information is generated by the compiler independently, without user directives or other pragmatic information.

The shreds may be scheduled to run on one or more OS-sequestered sequencers. The OS-sequestered sequencers are sometimes referred to herein as "OS-invisible"; the operating system does not schedule work on such sequencers. The mechanisms described herein may be utilized with single-core or multi-core multithreading systems. In the following description, numerous specific details such as processor types, multithreading environments, system configurations, and numbers, type and topology of sequencers in a multi-sequencer system have been set forth to provide a more thorough understanding of the present invention. It will be appreciated, however, by one skilled in the art that the invention may be practiced without such specific details. Additionally, some well known structures, circuits, and the like have not been shown in detail to avoid unnecessarily obscuring the present invention.

A shared-memory multiprocessing paradigm may be used in an approach referred to as parallel programming. According to this approach, an application programmer may split a software program, sometimes referred to as an "application" or "process," into multiple tasks to be run concurrently in order to express parallelism for a software program. All threads of the same software program ("process") share a common logical view of memory.

Figure 1:
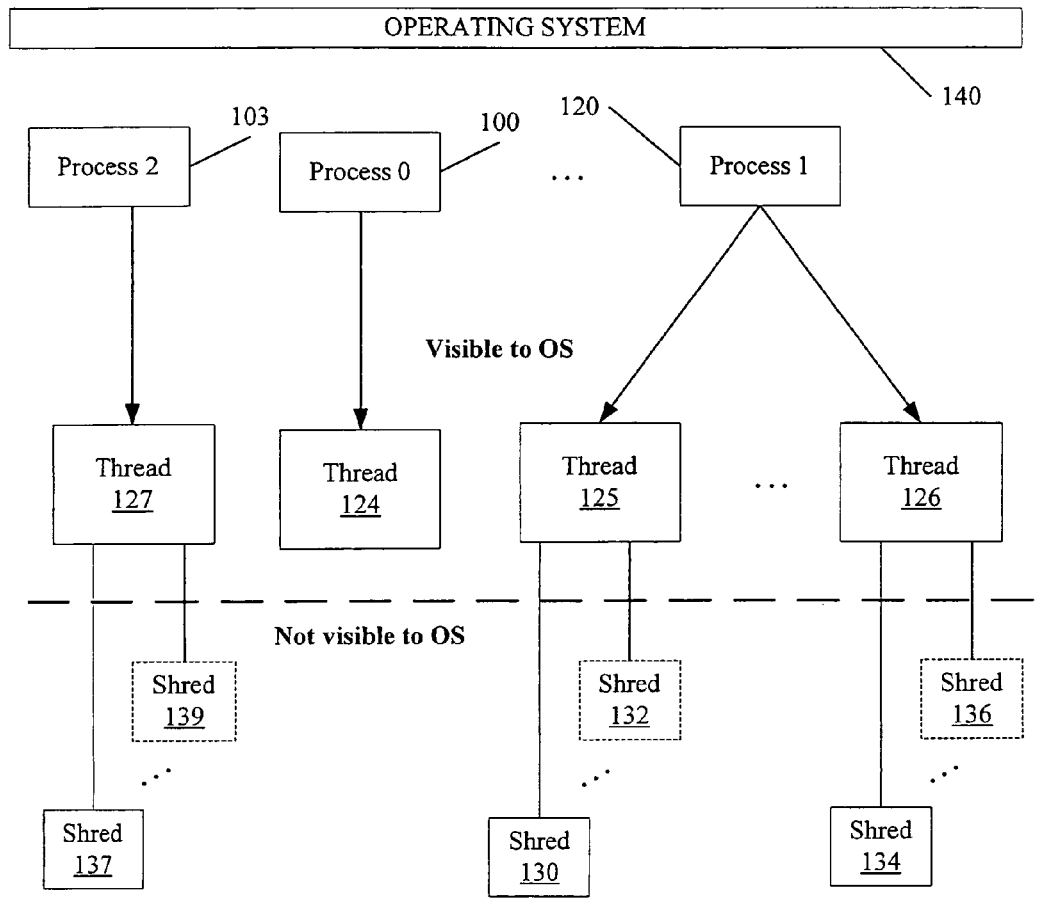
FIG. 1 is a block diagram presenting a graphic representation of a general parallel programming approach for a multi-sequencer system.

FIG. 1 is a block diagram illustrating a graphic representation of a parallel programming approach on a multi-sequencer multithreading system. FIG. 1 illustrates processes 100, 103, 120 that are visible to an operating system ("OS")

140. These processes 100, 103, 120 may be different software application programs, such as, for example, a word processing program, a graphics program, and an email management program. Commonly, each process operates in a different virtual address space.

The operating system ("OS") 140 is commonly responsible for managing the user-defined tasks for a process (e.g., processes 103 and 120). While each process has at least one task (see, e.g., process 0 and process 2, bearing reference numerals 100 and 103, respectively), others may have more than one (e.g., Process 1, bearing reference numeral 120). The number of processes illustrated in FIG. 1, as well as the number of user-defined tasks for each process, should not be taken to be limiting. Such illustration is for explanatory purposes only.

FIG. 1 illustrates a distinct thread 125, 126 for each of the user-defined tasks associated with a process 120 may be created in operating system 140, and the operating system 140 may map the threads 125, 126 to thread execution resources. (Thread execution resources are not shown in FIG. 1, but are discussed in detail below.) Similarly, a thread 127 for the user-defined task associated with process 103 may be created in the operating system 140; so may a thread 124 for the user-defined task associated with process 0.

The OS 140 is commonly responsible for scheduling these threads 125, 126, 127 for execution on the execution resources. The threads associated with the same process typically have the same virtual memory address space.

Because the OS 140 is responsible for creating, mapping, and scheduling threads, the threads 125, 126, 127 are "visible" to the OS 140. In addition, embodiments of the present invention comprehend additional user-level threads 130-139 that are not visible to the OS 140. That is, the OS 140 does not create, manage, or otherwise acknowledge or control these additional user-level threads 130-139. These additional threads, which are neither created nor controlled by the OS 140, and may be scheduled to execute concurrently with each other, are sometimes referred to herein as "shreds" 130-139 in order to distinguish them from OS-visible threads and to further distinguish them from PTHREADS or other user-level threads that may not be executed concurrently with each other for the same OS-visible thread. The shreds are created and managed by user-level programs (referred to as "shredded programs") and may be scheduled to run on sequencers that are sequestered from the operating system. The OS-sequestered sequencers typically share a common set of ring 0 states as OS-visible sequencers. These shared ring-0 architectural states are typically those responsible for supporting a common shared memory address space between the OS-visible sequencer and OS-sequestered sequencers. For example, for an embodiment based on IA-32 architecture, CR0, CR2, CR3, CR4 are some of these shared ring-0 architectural states. Shreds thus share the same execution environment (virtual address map) that is created for the threads associated with the same process.

As used herein, the terms "thread" and "shred" include, at least, the concept of a set of instructions to be executed concurrently with other threads and/or shreds of a process. The thread and "shred" terms both encompass the idea, therefore, of a set of software primitives or application programming interfaces (API). As used herein, a distinguishing factor between a thread (which is OS-controlled) and a shred (which is not visible to the operating system and is instead user-controlled), which are both instruction streams, lies in the difference of how scheduling and execution of the respective thread and shred instruction streams are managed. A thread is generated in response to a system call to the OS. The OS generates that thread and allocates resources to run the thread. Such resources allocated for a thread may include data structures that the operating system uses to control and schedule the threads.

In contrast, at least one embodiment of a shred is generated via a user level software "primitive" that invokes an OS-independent mechanism for generating a shred that the OS is not aware of. A shred may thus be generated in response to a user-level software call. For at least one embodiment, the user-level software primitives may involve user-level (ring-3) instructions that can create a user-level shred in hardware or firmware. The user-level shred thus created may be scheduled by hardware and/or firmware and/or user-level software. The OS-independent mechanism may be software code that sits in user space, such as a software library. The techniques for shred scheduling optimizations discussed herein may be used with any user-level thread package.

Figure 2:
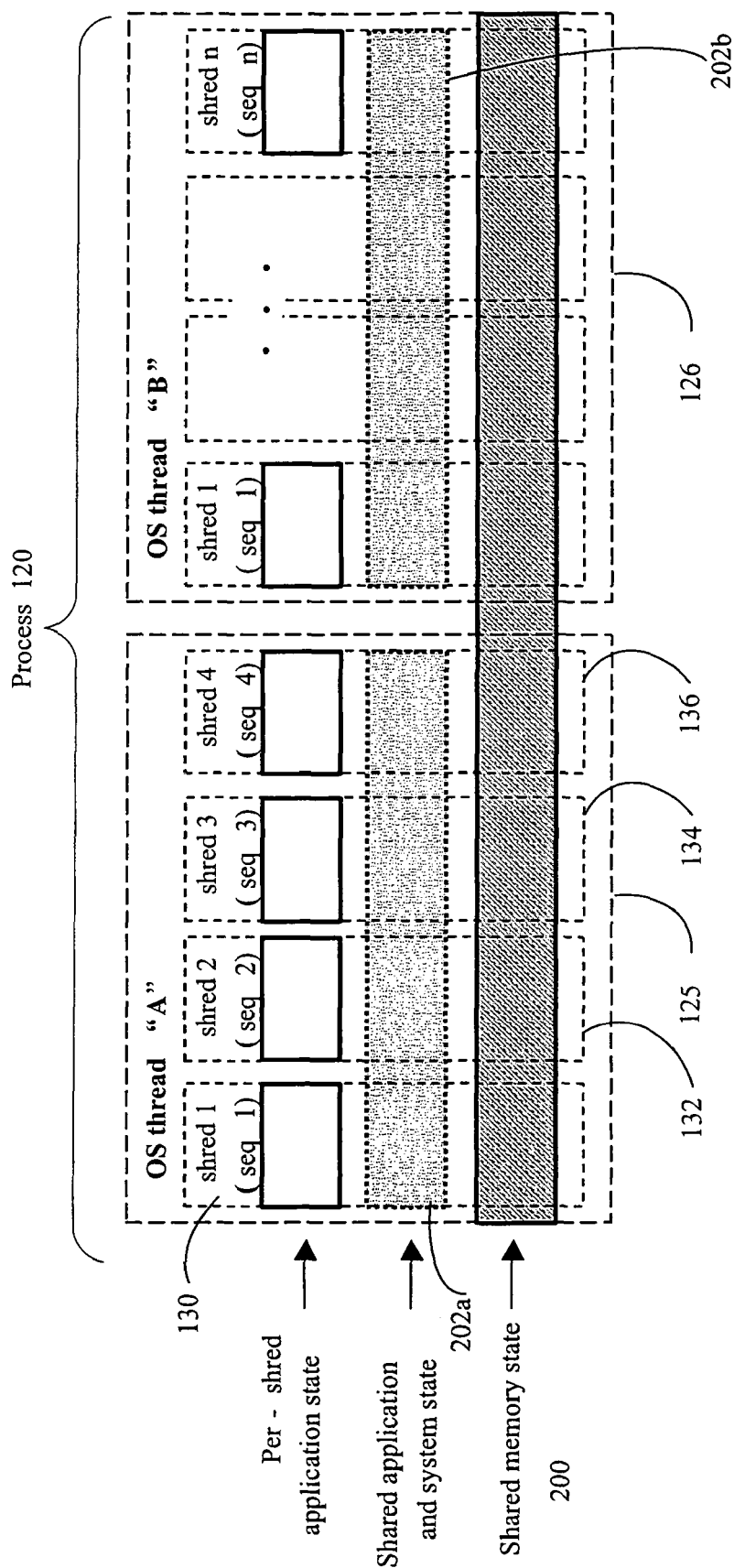
FIG. 2 is a block diagram illustrating shared memory and state among threads and user-level threads for at least one embodiment of user-level multithreading.

FIG. 2 is a block diagram illustrating, in graphical form, further detail regarding the statement, made above, that all threads of the same software program or process share a common logical view of memory. This common logical view of memory that is associated with all threads for a program or process may be referred to herein as an "application image." For embodiments of the present invention, this application program image is also shared by shreds associated with a process 100, 103, 120 (FIG. 1). FIG. 2 is discussed herein with reference to FIG. 1.

FIG. 2 depicts the graphical representation of a process 120, threads 124, 125, 126 and shreds 130-136 illustrated in FIG. 1. However, such representation should not be taken to be limiting. Embodiments of the present invention do not necessarily impose an upper or lower bound on the number of threads or shreds associated with a process. Regarding a lower bound, FIG. 1 illustrates that every process running at a given time is associated with at least one thread. However, the threads need not necessarily be associated with any shreds at all. For example, Process 0 (100) illustrated in FIG. 1 is shown to run with one thread 124 but without any shreds at the particular time illustrated in FIG. 1.

However, other processes 103, 120 may be associated with one or more OS-scheduled threads as illustrated in FIG. 1. Dotted lines and ellipses are used in FIG. 1 to represent optional additional shreds. FIG. 1 illustrates one process 103 associated with one OS-scheduled thread 127 and also illustrates another process 120 associated with two or more threads 125-126. In addition, each process 103, 120 may additionally be associated with one or more shreds 137-139, 130-136, respectively. The representation of two threads 125, 126 and four shreds 130-136 for Process 1 120 and of one thread 127 and two shreds 137, 139 for Process 2 103 is illustrative only and should not be taken to be limiting. The number of OS-visible threads associated with a process may be limited by the OS program. However, the upper bound for the cumulative number of shreds associated with a process is limited, for at least one embodiment, only by the amount of algorithmic thread level parallelism and the number of shred execution resources (e.g. number of sequencers) available at a particular time during execution.

FIG. 2 illustrates that a second thread 126 associated with a process 120 may have a different number (n) of shreds associated with it than the first thread 125. (N may be 0 for either or both of the threads 125, 126.)

FIG. 2 illustrates that a particular logical view 200 of memory is shared by all threads 125, 126 associated with a particular process 120. FIG. 2 illustrates that each thread 125, 126 has its own application and system state 202a, 202b, respectively. FIG. 2 illustrates that the application and system state 202 for a thread 125, 126 is shared by all shreds (for example, shreds 130-136) associated with the particular thread. For at least one embodiment, for example, all shreds associated with a particular shred may share the ring 0 states and at least a portion of the application states associated with the particular thread.

Accordingly, FIG. 2 illustrates that a system for at least one embodiment of the present invention may support a 1-to-many relationship between an OS-visible thread, such as thread 125, and the shreds 130-136 (which are not visible to the OS) associated with the thread. The shreds are not "visible" to the OS (see 140, FIG. 1) in the sense that a programmer, not the OS, may employ user-level techniques to create, synchronize and otherwise manage and control operation of the shreds. While the OS 140 is aware of, and manages, one or more threads, the OS 140 is not aware of, and does not manage or control, shreds.

Thus, instead of relying on the operating system to manage the mapping between thread unit hardware and shreds, scheduler logic in user space may manage the mapping. For at least one embodiment, the scheduler logic may be in a runtime software library.

For at least one embodiment a user may directly control such mapping by utilizing shred control instructions or primitives that are handled by the scheduler or other logic in software, such as in a runtime library. In addition, the user may directly manipulate control and state transfers associated with shred execution. Accordingly, for embodiments of the methods, mechanisms, articles of manufacture, and systems described herein, a user-visible feature of the architecture of the thread units is at least a canonical set of instructions that allow a user direct manipulation and control of thread unit hardware.

As used herein, a thread unit, also interchangeably referred to herein as a "sequencer", may be any physical or logical unit capable of executing a thread or shred. It may include next instruction pointer logic to determine the next instruction to be executed for the given thread or shred. For example, the OS thread 125 illustrated in FIG. 1 may execute on a sequencer, not shown, as "Thread A" 125 in FIG. 2, while each of the active shreds 130-136 may execute on other sequencers, "seq 1"-"seq 4", respectively. A sequencer may be a logical thread unit or a physical thread unit. Such distinction between logical and physical thread units is illustrated in FIG. 3.

Figure 3:
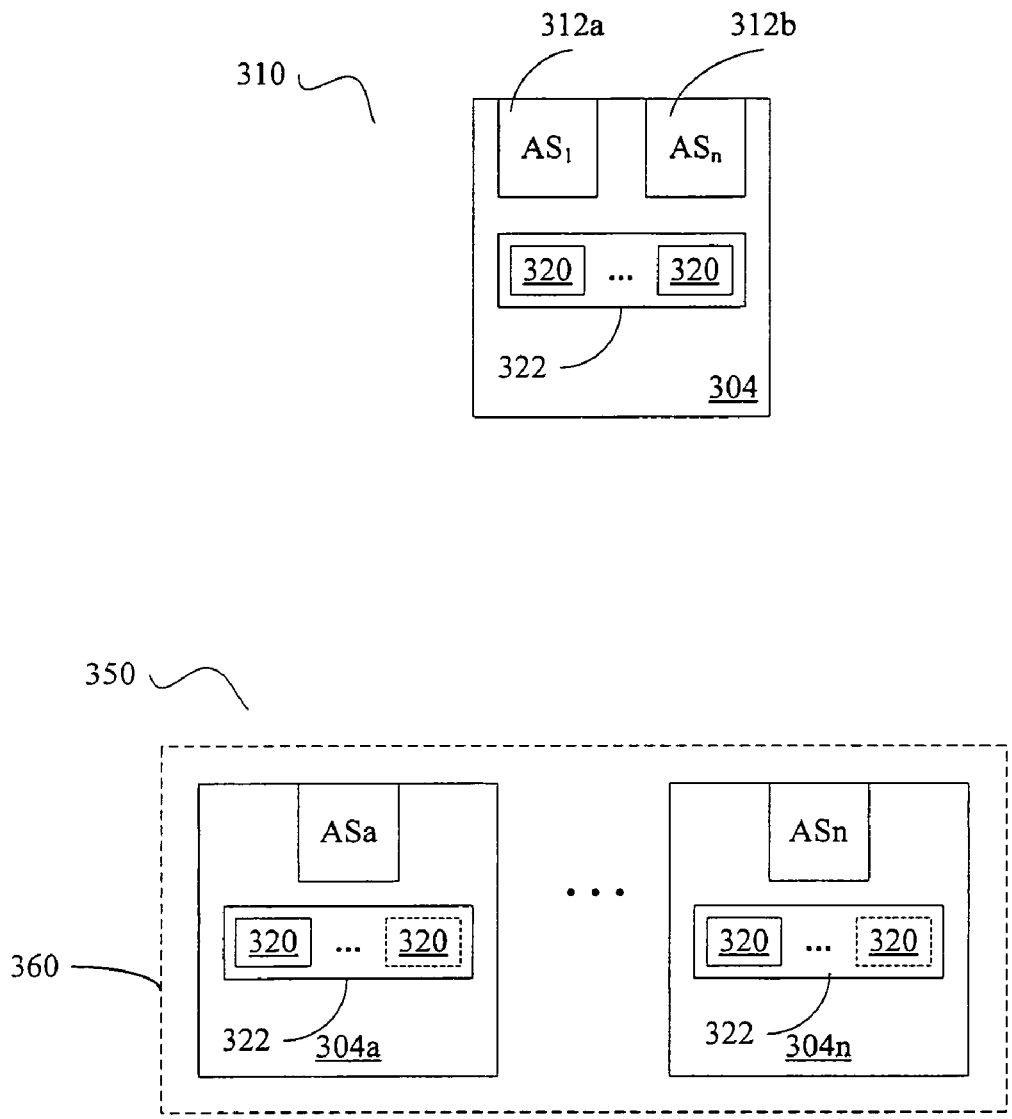
FIG. 3 is a block diagram illustrating various embodiments of multi-sequencer systems.

FIG. 3 is a block diagram illustrating selected hardware features of embodiments 310, 350 of a multi-sequencer system capable of performing disclosed techniques. FIG. 3 illustrates selected hardware features of a single-core multi-sequencer multithreading environment 310. FIG. 3 also illustrates selected hardware features of a multiple-core multithreading environment 350, where each sequencer is a separate physical processor core.

In the single-core multithreading environment 310, a single physical processor 304 is made to appear as multiple logical processors (not shown), referred to herein as $LP_1$ through $LP_n$, to operating systems and user programs. Each logical processor $LP_1$ through $LP_n$ maintains a complete set of the architecture state $AS_1$-$AS_n$, respectively. The architecture state includes, for at least one embodiment, data registers, segment registers, control registers, debug registers, and most of the model specific registers. The logical processors $LP_1$-$LP_n$ share most other resources of the physical processor 304, such as caches, execution units, branch predictors, control logic and buses. Although such features may be shared, each thread context in the multithreading environment 310 can independently generate the next instruction address (and perform, for instance, a fetch from an instruction cache, an execution instruction cache, or trace cache). Thus, the processor 304 includes logically independent next-instruction-pointer and fetch logic 320 to fetch instructions for each thread context, even though the multiple logical sequencers may be implemented in a single physical fetch/decode unit 322. For a single-core multithreading embodiment, the term "sequencer" encompasses at least the next-instruction-pointer and fetch logic 320 for a thread context, along with at least some of the associated architecture state, 312, for that thread context. It should be noted that the sequencers of a single-core multithreading system 310 need not be symmetric. For example, two single-core multithreading sequencers for the same physical core may differ in the amount of architectural state information that they each maintain.

A single-core multithreading system can implement any of various multithreading schemes, including simultaneous multithreading (SMT), switch-on-event multithreading (SoeMT) and/or time multiplexing multithreading (TMUX). When instructions from more than one hardware thread contexts (or logical processor) run in the processor concurrently at any particular point in time, it is referred to as SMT. Otherwise, a single-core multithreading system may implement SoeMT, where the processor pipeline is multiplexed between multiple hardware thread contexts, but at any given time, only instructions from one hardware thread context may execute in the pipeline. For SoeMT, if the thread switch event is time based, then it is TMUX.

Thus, for at least one embodiment, the multi-sequencer system 310 is a single-core processor 304 that supports concurrent multithreading. For such embodiment, each sequencer is a logical processor having its own instruction next-instruction-pointer and fetch logic and its own architectural state information, although the same physical processor core 304 executes all thread instructions. For such embodiment, the logical processor maintains its own version of the architecture state, although execution resources of the single processor core may be shared among concurrently-executing threads.

FIG. 3 also illustrates at least one embodiment of a multi-core multithreading environment 350. Such an environment 350 includes two or more separate physical processors 304a-304n that is each capable of executing a different thread/shred such that execution of at least portions of the different threads/shreds may be ongoing at the same time. Each processor 304a through 304n includes a physically independent fetch unit 322 to fetch instruction information for its respective thread or shred. In an embodiment where each processor 304a-304n executes a single thread/shred, the fetch/decode unit 322 implements a single next-instruction-pointer and fetch logic 320. However, in an embodiment where each processor 304a-304n supports multiple thread contexts, the fetch/decode unit 322 implements distinct next-instruction-pointer and fetch logic 320 for each supported thread context. The optional nature of additional next-instruction-pointer and fetch logic 320 in a multiprocessor environment 350 is denoted by dotted lines in FIG. 3.

For at least one embodiment of the multi-core system 350 illustrated in FIG. 3, each of the sequencers may be a processor core 304, with the multiple cores 304a-304n residing in a single chip package 360. Each core 304a-304n may be either a single-threaded or multi-threaded processor core. The chip package 360 is denoted with a broken line in FIG. 3 to indicate that the illustrated single-chip embodiment of a multi-core system 350 is illustrative only. For other embodiments, processor cores of a multi-core system may reside on separate chips. That is, the multi-core system may be a multi-socket symmetric multiprocessing system.

For ease of discussion, the following discussion focuses on embodiments of the multi-core system 350. However, this focus should not be taken to be limiting, in that the mechanisms described below may be performed in either a multi-core or single-core multi-sequencer environment.

Figure 4:
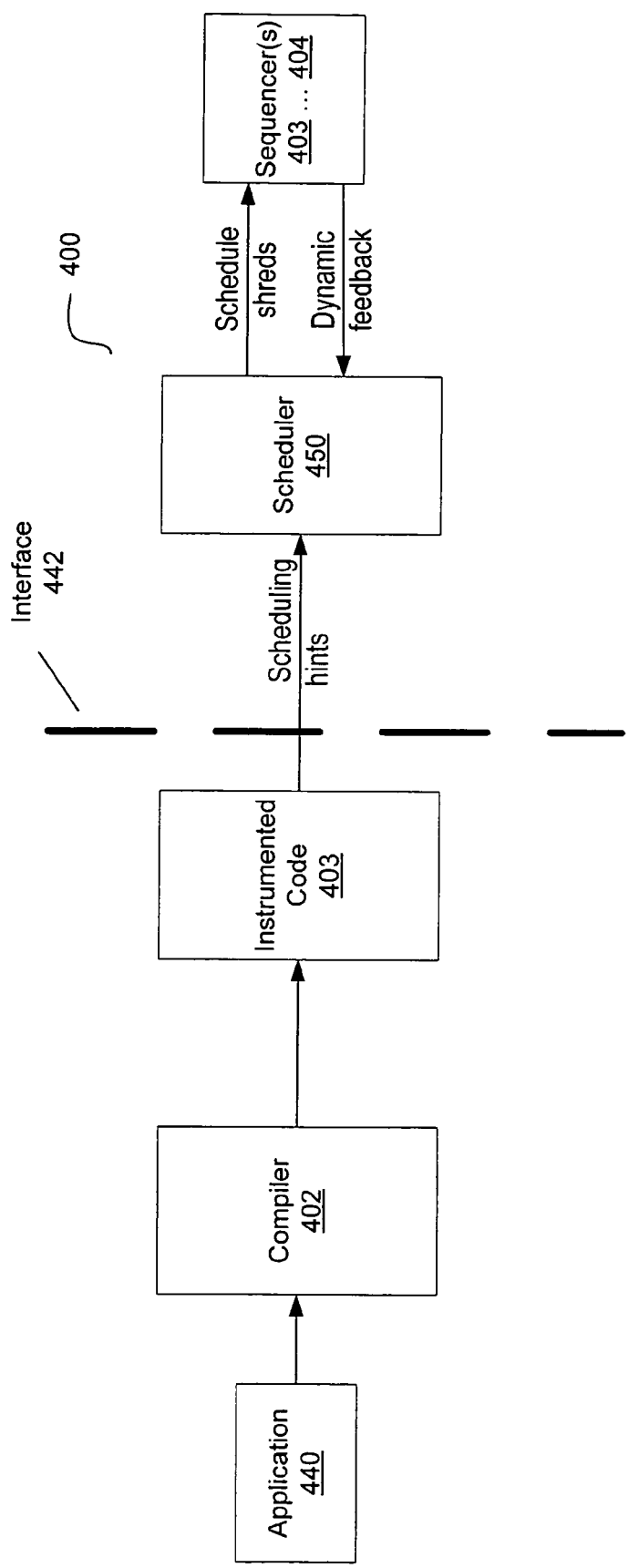
FIG. 4 is a data flow diagram illustrating at least one embodiment of a multi-sequencer multithreading system that supports user-level threads and receives scheduling hints from a compiler.

FIG. 4 is a data flow diagram illustrating at least one embodiment of a system 400 for a multi-sequencer multithreading system that supports shred control. FIG. 4 illustrates that the system 400 includes a scheduler routine 450. The scheduler routine 450 may be "distributed" in that all or a portion of the routine 450 executes on each of multiple sequencers 403, 404. For at least one embodiment, the scheduler 450 may operates to schedule shreds that are created as a result of API-like shred control (e.g., shred_create, shred_fork and/or the like) or shred synchronization (e.g., shred_yield, mutex (shred_lock/shred_unlock), critical section, and/or the like) instructions or primitives.

An operating system ("OS") (see, e.g., 140 of FIG. 1) may operate independently from the scheduler routine 450 to schedule OS-managed threads. In contrast, the scheduler routine 450, rather than a scheduling mechanism provided by the OS, schedules the user-level shreds. Each shred is therefore scheduled by the scheduler routine 450 for execution, independent of OS scheduling logic. Each shred may be scheduled to execute on either an OS-sequestered or OS-visible sequencer.

FIG. 4 illustrates that a compiler 402 may receive as input a user program 440. The user program may be "shredded" in that it may include one or more user-level shred creation instructions (or "primitives"). For at least one embodiment, the user-level instructions that trigger creation of shreds are API-like ("Application Programmer Interface") shred control primitives such as "shred_create" or "shred_fork".

The compiler 402 may, when it encounters one of these shred control primitives in the shredded application 440, generate instead a primitive extension that is placed into the instrumented code 403 that is produced by the compiler 402. That is, the API-like primitives defined for interface 442 may, for at least one embodiment of the present invention, include one or more extensions for passing scheduling hints from the compiler to the scheduler (e.g., shred_create_attr, discussed below in connection with Table 2). The compiler 402 may insert such primitive extensions into the instrumented code 403 for each minimal unit of execution ("MUE") as is described below in the section entitled "Generation of Hints by the Compiler."

In addition, the compiler 402 may also generate in the instrumented code 403 one or more instructions to update the hint values (see, e.g., values of the attribute table shown in Table 2, below).

The scheduler routine 450 may receive scheduling hints from instrumented code 403 that has been generated by a compiler 402 in order to provide hints to the scheduler routine 450. The compiler 402 may generate initial values for the hints based on static analysis or profiling of a shredded user program 440. (As is mentioned above, the hint values may be updated during runtime in response to instructions placed by the compiler 402 into the instrumented code 403.)

As used herein, a "shredded" program is a user-level program that includes one or more shred creation/control primitives or instructions. The hints are generated independently by the compiler 402, without user input such as pragmatic information. The hints may be provided from the instrumented code 403 to the scheduler 450 via an interface 442.

The system 400 illustrated in FIG. 4 may thus receive compiler-generated hints that may be passed to the scheduler 450 and may be used by the scheduler 450 to more judiciously perform dynamic shred scheduling in order to improve thread-level parallelism for a shredded program. The compiler 402 is capable of independently generating the hints, and the scheduler 450 can utilize the hints to perform more efficient shred scheduling.

One of skill in the art will recognize that there may be one or more levels of abstraction between the programmer's code 440 (e.g., code that includes an API-like shred creation primitive) and actual architectural instructions that cause a sequencer to execute a shred.

As used herein, an instruction or primitive described as being generated by a programmer or user is intended to encompass not only architectural instructions that may be generated by an assembler or compiler based on user-generated code, or by a programmer working in an assembly language, but also any high-level primitive or instruction that may ultimately be assembled or compiled into architectural shred control instructions. It should also be understood that an architectural shred control instruction may be further decoded into one or more micro-operations.

During analysis of the user application 440, the compiler 402 may identify information (hints) that could be beneficial to the scheduler 450 as the scheduler attempts to dynamically optimize shred scheduling during run-time. At compile-time, the compiler 402 has access to more semantic information about the program 440 than the scheduler 450 is exposed to during run-time of the user program 440. Based on the threaded algorithm that the application developer employs in the user program 440, the compiler 402 may statically capture and highlight (via passing of hints) potential areas where a run-time scheduler can act to dynamically schedule shreds in a manner that enhances performance or reduces power consumption. The compiler 402 can thus statically generate hints that the run-time scheduler 450 can use during dynamic scheduling. Because they are "hints" that do not affect program correctness, the scheduler 450 is also free to disregard the hints.

Regarding generation of the hints, a compiler 402 may, before the application 440 is executed, perform offline dependence analysis to determine which units of execution in a shred occur often and may be performed as an independent unit of execution. In this manner, the compiler 402 is able to determine which portions of shred can be performed independently, so that each independent portion of work could be allocated to a different physical sequencer (if available at runtime), in order to increase thread-level parallelism of the program 440.

The scheduler 450 may also take into account runtime feedback as well as the compiler hints that were generated before runtime. Some of the run-time characteristics of the system 400 that the scheduler 450 may take into account, in addition to (or instead of) the compiler hints, may include, without limitation, sequencer utilization and availability, cache configuration, how many shreds have currently been scheduled, and the like.

It should be noted that the sequencers 403, 404 illustrated in FIG. 4 need not be symmetric, and the number of sequencers illustrated in FIG. 4 should not be taken to be limiting. Regarding the number of sequencers, the scheduling mechanism 400 may be utilized for any number of sequencers. The illustration of only two sequencers in FIG. 4 is for illustrative purposes only. One of skill in the art will recognize that a system may include more than two sequencers, which may be all of a single sequencer type (symmetric) or may each be one of multiple sequencer types (asymmetric). For example, and without limitation, the scheduling mechanism may be implemented for a multi-sequencer system that includes four, eight, sixteen, thirty-two or more symmetric and/or asymmetric sequencers.

Regarding symmetry, FIG. 4 illustrates scheduling logic 450 for a system 400 that may include at least two types of sequencers—Type A sequencers 403 and Type B sequencers 404. Each sequencer 403, 404 may include or run a portion of a distributed scheduler routine 450. The portions may be identical copies of each other, but need not necessarily be so.

The sequencers 403, 404 may be asymmetric, in that they may differ in any manner, including those aspects that affect quality of computation. The sequencers may differ in terms of power consumption, speed of computational performance, functional features, or the like. By way of example, for one embodiment, the sequencers 403, 404 may differ in terms of functionality. For example, one sequencer may be capable of executing integer and floating point instructions, but cannot execute a single instruction multiple data ("SIMD") set of instruction extensions, such as Streaming SIMD Extensions 3 ("SSE3"). On the other hand, another sequencer may be capable of performing all the instructions that the first sequencer can execute, and can also execute SSE3 instructions.

As another example of functional asymmetry, one sequencer 403 may be visible to the OS (see, for example, 140 of FIG. 1) and may therefore be capable of performing supervisor mode (e.g., "ring 0" for IA-32) operations such as performing system calls, servicing a page fault, and the like. On the other hand, another sequencer 404 may be sequestered from the OS, and therefore be capable of only user-level (e.g., "ring-3" for IA-32) operations and incapable of performing ring 0 operations.

The sequencers of a system on which the scheduling mechanism 400 is utilized may also differ in any other manner, such as footprint, word width and/or data path size, topology, memory, power consumption, number of functional units, communication architectures (multi-drop vs. point-to-point interconnect), or any other metric related to functionality, performance, footprint, or the like.

For at least one embodiment, the functionality of type A 403 and type B 404 sequencers may be mutually exclusive. That is, for example, one type of sequencer 403 may support a particular functionality, such as execution of SSE3 instructions, that the other type of sequencer 404 does not support; while the second type of sequencer 404 may support a particular functionality, such as ring 0 operations, that the first type of sequencer 403 does not support.

However, for at least one other embodiment, the functionality of sequencer types A 403 and B 404 represent a superset-subset functionality relationship rather than a mutually exclusive functionality relationship. That is, a first set of sequencers (such as type A sequencers 403) provide a superset of functionality that includes all functionality of a second set of sequencers (such as type B sequencers 404), plus additional functionality that is not provided by the second set of sequencers 404.

Generally speaking, the system illustrated in FIG. 4 utilizes a hybrid approach for dynamic shred scheduling in order to take advantage of the particular respective strengths of the compiler 402 and the scheduler 450. The compiler 402 has full knowledge of program semantics and is therefore well-suited to perform functional decomposition to uncover for a shred the minimal units of thread execution ("MUE") that may be performed independently in order to increase thread-level parallelism. Decomposition may involve global dependence analysis and is therefore more easily performed by the compiler than the scheduler. Accordingly, the compiler 402 may be able to provide more robust scheduling hints than those that could be gleaned by the scheduler 450 during run-time; the compiler 402 passes these hints to the scheduler 450 through the interface 442.

In contrast, the scheduler 450 is more suited to using the information regarding MUE, which was gleaned by the compiler, to adaptively perform migration and aggregation of MUE's. The scheduler 450 has full knowledge of the number of processors of the system, the cache configuration of the system, the interconnect topology of the system, and potential imbalances in resource distribution and functional asymmetry among sequencers. Therefore, the scheduler 450 is well-suited to adaptively aggregate the MUE's and/or align MUE's with available resources at run-time for a given target multi-sequencer system.

In other words, fission (breaking computations of the shreds in a user application 440 into independent units of work and generating the associated hints) is more easily performed by the compiler, while aggregation (that is, aligning MUE's with sequencers in a resource-efficient manner) is better performed by the dynamic shred scheduler 450 at run-time.

Accordingly, FIG. 4 illustrates a hybrid approach that includes both static and dynamic components in order to adaptively deliver the best performance for various different runtime platforms. Static analysis or off-line profiling is performed by the compiler 402 to generate application-specific compiler hints, thereby relieving the run-time scheduler from performing such dependence analysis at run-time. Dynamic utilization of the hints by the scheduler 450 during run-time allows the scheduling to be performed in a manner that efficiently utilizes the run-time resources of the particular system.

Interface for Passing Hints from the Compiler to the Scheduler.

As an initial matter, this section discusses at least one embodiment of the interface 442 for passing shred scheduling hints from the compiler 402 to the scheduler 450. In the following sections, further detail is provided regarding how the compiler 402 may statically generate (either through static analysis or off-line profiling) the hints and how the scheduler 450 may utilize the hints during dynamic run-time scheduling of shreds.

Regarding the interface 442, it may be implemented as an API ("Application Programmer Interface") type of interface between the compiler 402 and the scheduling logic 450. The API that provides the interface 442 may include an attribute data structure. Such data structure, referred to herein as an attribute table (ATTR), may be maintained by the compiler 402 and passed to the scheduler 450. On creation of a shred, the compiler 402 is thus responsible for setting up the attribute data structure for the shred and for passing this information to the scheduler logic 450.

The compiler 402 may maintain and manage a separate attribute table for each shred in the compiled application program 440. The interface 442 includes primitives that explicitly provide for passing of information in the attribute table for a shred from the compiler 402 to the scheduler 450. For at least one embodiment, these primitives are extensions to existing shred creation and control primitives. (See discussion of shred_create_attr, below).

The attribute table may include an entry for each type of hint such that it includes all of the optimization hints, for a particular shred, that can exist between the compiler and the scheduler. The data structure is thus responsible for expressing and carrying, for a particular shred, all of the possible optimization hints defined on the interface 442. Although certain types of hints are described herein, it should be understood that the nature of the attribute table makes it particularly amendable to inclusion of additional, or different, types of hints than those described herein.

A data structure that holds optimization hints allows future amendments to the data structure to be implemented with relative ease so that additional, or different, hints may be added to the data structure. The attribute table may therefore be modified as needed to meet design considerations.

The information in the table, whatever hints it includes, may be passed from the compiler 402 to the scheduler 450 via an API primitive. For at least one embodiment, such primitive may be an extension of other shred creation instructions or primitives, the extension indicating that the attribute table is to be passed as a parameter. For example, a "shred_create" primitive may be extended to include the attribute table. An example of such at least one embodiment of such an extension, "shred_create_attr", may include parameters as shown below in Table 2 (discussed in further detail below).

The attribute table, as indicated above, may contain an entry for each type of hint that may be passed from the compiler to the scheduler. For at least one embodiment, the types of hints included in the attribute table are set forth in Table 1, below.

TABLE 1

| Hint Type | Description |
| --- | --- |
| Imbalance | Indicates the degree of computation associated with the MUE. In effect, indicates the amount of work to be performed by the MUE, so that load balancing may be performed |
| Fusion | Indicates whether an MUE is conformable with other MUE's, whether it can be aggregated with another MUE, and whether it has a dependence with a prior MUE |
| Locality | Indicates degree of data-sharing with other shreds |

One embodiment of the attribute data structure may be represented in pseudocode as set forth in Table 1A:

TABLE 1A

```
Typedef struct {
    int imbalance;
    int fusion;
    int locality;
    int hotspot;
} attr;
```

Upon creation of a shred, the compiler is responsible for setting up and maintaining the attribute data structure and for passing the attribute data to the scheduler. The compiler may do so as follows. If the compiler encounters a shred creation primitive in the application 440, the compiler generates an instance of the attribute table for that shred. The compiler populates the attribute table with any hints that are appropriate. The compiler may replace the shred creation instruction with a modified shred creation instruction (e.g., "shred_create_attr", discussed below in connection with Table 2), which includes the attribute table for the shred as a parameter. In this manner, the compiler sets up and populates an instance of the attribute table for each shred.

Regarding how the attribute table information is passed to the scheduler, reference is made to Table 2. Table 2 illustrates that an API that includes shred creation and control instructions or primitives may be modified to provide for extensions that allow passing of the attribute table to the scheduler. In particular, Table 2 illustrates a modification to the API in order to support the new attribute data structure for a shred_create primitive. Table 2 illustrates a modification to pseudocode for the shred_create function that may be performed when a shred_create_attr primitive is executed. The function may be part of a software program in user space, such as a software library.

TABLE 2

| 2.0 API to support shred creation | |
| --- | --- |
| void shred_create( | |
|     shred_t* s, | // return the shred |
|     size_t stack_sz, | // stack size for shred |
|     shred_task_t funcptr, | // pointer to function |
|     void* arg); | // function arguments |
| 2.1 API extension to support shred creation AND attribute data structure | |
| void shred_create_attr( | |
|     shred_t* s, | // return the shred |
|     size_t stack_sz, | // stack size for shred |
|     attr_t attr | // attribute for optimizations |
|     shred_task_t funcptr, | // pointer to function |
|     void* arg); | // function arguments |

Each of the hints passed through the interface 442 in the ATTR table may be generated statically by the compiler during offline analysis of the user program 440. As is illustrated in Table 1, above, these hints may include Imbalance/Asymmetry, Locality, and Fusion hints. These types of hints provide information that the scheduler 450 may utilize to perform dynamic optimizations that migrate, co-locate, and/or fuse shreds.

Generation of Hints by the Compiler.

Figure 5:
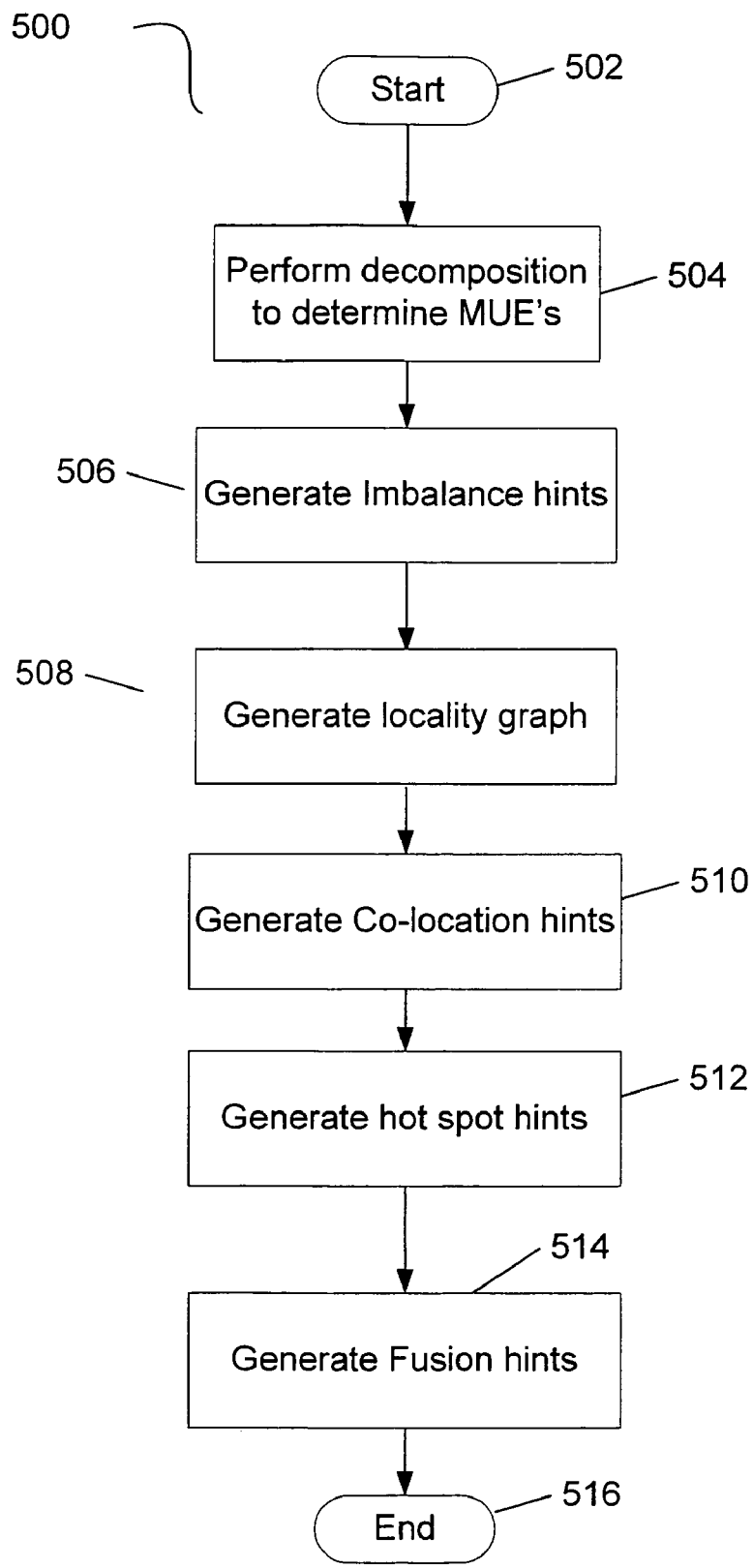
FIG. 5 is a flowchart illustrating at least one embodiment of a method for generating compiler hints for user-level thread scheduling.

Moving to a discussion of the generation of hints, FIG. 5 is consulted in conjunction with FIG. 4. FIG. 5 illustrates at least one embodiment of a method 500 that may be performed by the compiler 402 to generate scheduling hints to be passed to the scheduler 450 via the interface 442. The method 500 may be performed for any compilation unit, such as a program. FIG. 5 illustrates that the method begins at block 502 and proceeds to block 504.

At block 504, the compiler performs dependence analysis to determine which portions of the shreds in the program may be performed independently in order to increase parallelism of the program. The compiler 402 may perform this "computation decomposition" 504 statically (that is, it may be performed offline before the user program is executed at runtime). During this decomposition, the compiler 402 may identify one or more MUE's, which are basic units of work that may be scheduled to execute independently.

For the degenerate case, for example, if the entire program is serial, the MUE is the whole program; hence the workload is imbalanced. By breaking up the shreds of the user application into smaller independent units of work (MUE's), the compiler may enable the scheduler to address workload imbalance in applications that include shreds. If the compiler decomposes 504 the shreds into MUE's aggressively, the scheduler then has larger freedom to adaptively perform runtime workload balancing and increase parallelism.

The decomposition 504 performed by the compiler 402 to identify the MUE's of the user program 440 should also satisfy data dependence constraints. For example, if a unit of work is processed independently in a loop iteration, the compiler may identify loop iteration as the minimal unit of thread execution, using standard data dependence analysis on the loop. In general, if the dependence analysis performed by the compiler 402 shows that there is no loop-carried dependence among the iterations of a loop, each loop iteration may be viewed as an MUE.

Accordingly, the compiler 402 may perform computation decomposition at block 504, in accordance with data dependence constraints, to aggressively identify as many MUE's in the user program 440 as possible. The more MUE's identified by the compiler 402 at block 504, the more freedom the scheduler 450 has to adaptively perform scheduling to improve performance.

In essence, an MUE identified by the compiler at block 504 is a virtual shred that may be independently mapped to, and executed on, a physical sequencer of the system based on run-time knowledge. For each MUE that it identifies, the compiler does the following: it inserts a shred creation primitive or instruction into the compiled code, and it generates an attribute structure (see, e.g., Table 1A, above) for each MUE.

Regarding insertion of the shred creation primitive or instruction, reference is made to Table 2, above. A modified shred creation instruction (Table 2.1) that passes the attribute structure as a parameter may be inserted by the compiler for each traditional shred creation instruction (Table 2.0) that the compiler encounters in the program. Thus, each shred as originally programmed is now associated with an attribute table.

However, through dependence analysis, decomposition, and/or profiling, the compiler may be able to break up the original shreds into smaller independent units of work (MUE's). For each of these MUE's that are identified, the compiler inserts an additional modified shred creation instruction (Table 2.1) and generates an associated attribute structure for each of them.

One of the hints that the compiler may place into the attribute structure for an MUE is an Imbalance hint. FIG. 5 illustrates that the Imbalance hint is calculated by the compiler 402 at block 506. The Imbalance hint may be an integer value that represents the degree of computation associated with the MUE. This value indicates to the scheduler 450 how much "work" is involved with the MUE, so that the scheduler 450 can balance the workload. From block 506, processing proceeds to block 508.

Allowing a compiler to statically group MUE's into threads, as some other known systems do, may lead to load imbalances at run-time. For example, the compiler 402 may be unaware of certain cache organization features of the particular run-time platform, and therefore be less able than the scheduler 450 to adaptively migrate an MUE from an overloaded sequencer to another available sequencer, based on run-time information about available system hardware resources.

Rather than having the compiler 402 group MUE's into threads, at least one embodiment of the system 400 allows the scheduler 450 to aggregate MUE's for execution if it makes sense from a performance-optimization point of view, given the scheduler's full knowledge of the run-time environment. Conversely, the scheduler 450 may migrate separate MUE's onto separate sequencers. Further discussion of how the scheduler utilizes compiler-generated hint information to perform such optimizations during run-time scheduling is set forth below in the following section.

Rather than, or in addition to, migrating MUE's among sequencers so that a workload is balanced, at least one embodiment of the scheduler 450 may co-locate MUE's that share data on the same, or nearby, sequencers. For example, shreds that share data may be scheduled on sequencers that are topologically adjacent to each other and/or on sequencers that share a cache. This type of optimization, referred to herein as co-location, is a type of migration, but it takes into account relationships among MUE's rather than merely considering workload balance.

FIG. 5 illustrates that, after the compiler has identified the MUE's at block 504, it may generate a graph at block 508 to represent the compilation unit (which may be, for example, a shredded program). For at least one embodiment of the compiler 402, the compiler 402 generates 508 the graph in order to generate various hints to be passed via the interface 442 to the scheduler 450.

FIG. 5 illustrates that the compiler 402 may generate at block 508 a co-location hint that the scheduler 450 may utilize to perform co-location. The Locality/co-location hints passed via the interface 442 from the compiler 402 to the scheduler 450 let the scheduler 450 know how heavily one MUE shares data with other MUE's. These Locality hints may be generated in the following manner.

The graph generated at block 508 is referred to herein as a "locality graph", where each node of the graph is an MUE as determined via computation decomposition. The graph may then be subjected to certain optimizations, such as graph reduction. A weight associated with an edge of the locality graph represents the amount of locality between the two connecting nodes (MUE's) of the edge.

For at least one embodiment, pseudocode for logic to generate 508 a locality graph is set forth in Table 3. The logic of Table 3 may be performed by the compiler 402 at block 508. Generally, Table 3 illustrates that the edges of a locality graph may reflect the compiler's computation of spatial locality, temporal locality, near-neighbor (stencil) locality, and reduction locality among MUE's. These values, as well as other intermediate values that the compiler may utilize to generate hints on the interface 442, may be maintained by the compiler in one or more data structures. At least one embodiment of such data structures is set forth in Table 4. Table 3 illustrates that the generation of the locality graph may take into account one or more of the values maintained in the Table 4 structures (generated based on the compiler's program analysis) as well as the estimated cache line size:

TABLE 3

```
build_locality_graph(a_compilation_unit)
{
    build_a_node_for_each_MUE( );
    for each IR (Namely, compiler's intermediate representation)
    being analyzed {
        if (reduction found) {
            add locality weight to the edges connecting the MUE's
            involved in the reduction
operation
        } else if (stencil found) {
            add locality weight between the near-neighbor MUE's,
            based on the stencil
pattern
        } else {
            /* Only current stream element is visible to the kernel */
            if (streams to different kernels are not conformable) {
                scale the streams to make it conformable
            }
            add weight for temporal locality between MUE's accessing
            the same data
            add weight for spatial locality between MUE's accessing
            the same cache line
        }
    }
}
```

TABLE 4

```
Locality_t {
    Int     Temporal;           //degree of temporal locality
    Int     Spatial;            //degree of spatial locality
}
Fusion_t {
    Int     Conformability;     //Is it conformable
    Int     Aggregation;        //Is there something else to fuse it with?
    Int     Dependence;         //Is there a dependence with another MUE
}
Imbalance_t {
    Int     degree;             //degree of computation
}
```

The pseudocode shown in Table 3, illustrates that, for at least one embodiment, reduction of the locality graph may be performed at block 508. A reduction operation indicates that data should be communicated between the MUE's for a parallel reduction between the MUE's. Accordingly, Table 3 indicates that if a reduction is performed, locality weights are added to the edges for the MUE's involved in the reduction.

Table 3 also indicates that the locality graph may take stencils into account. Stencils are near-neighbor dependences such as a[i]=function(b[i−1], b[i], b[i+1]). For at least one embodiment, a larger locality weight is added for stencil operations than is added for reductions.

Table 3 illustrates that weights may also be added at block 508 to the edges of the locality graph to reflect spatial and temporal locality among MUE's. That is, once the compiler has identified the MUE's it can also then identify the type of data that the MUE touches. The compiler 402 may, through static analysis or profiling, identify locality among MUE's. The compiler 402 may internally record this locality in the data structure illustrated in Table 4, and then use these values to generate weight values for the edges of the locality graph at block 508.

The weight on an edge of the locality graph may be modified to reflect spatial locality, which takes into account the likelihood that different MUE's may access the same cache line. Similarly, an edge between two MUE's may be modified to reflect that the two MUE's are likely to access the same data (temporal locality).

For at least one embodiment of the compiler 402, it is assumed that temporal locality may provide a larger performance benefit than spatial locality, if taken into account during scheduling, because temporal locality addresses use of the exact same data between MUE's. Thus, the compiler 402 may allocate a higher weight value for temporal locality than spatial locality when generating the locality graph. However, one of skill in the art will recognize that spatial locality can yield the same performance benefit as temporal locality, if taken into account during scheduling, if the runtime cache line size is large enough to hold the adjacent data for both MUE's.

In general, then, at least one embodiment of the compiler 402 utilizes the following general edge weighting scheme during generation of the locality graph: weight for temporal locality>=weight for spatial locality>=weight for stencil>=weight for reduction.

FIG. 5 illustrates that processing proceeds from block 508 to block 510. Based on the information in the locality graph, the compiler may generate a co-location hint at block 510. The co-location hint may be an integer value representing the amount of sharing that an MUE (e.g., the MUE associated with the specific instance of the ATTR table that includes the hint) has with other MUE's. Using the locality graph, the compiler 402 may generate a co-location hint at block 510 according the pseudocode illustrated in Table 5:

TABLE 5

Generation of Co-Location Hint

```
co_locate_for_locality(a_compilation_unit, threshold)
{
    build_locality_graph(a_compilation_unit);
    while (there exists an edge whose weight > threshold) {
        /* If multiple edges in the graph have identical weight, one is
           arbitrarily chosen */
        edge = find_edge_with_heaviest_weight( );
        /* Produce co-locate compiler hint for the two nodes
           corresponding to this edge for
scheduler */
        colocate_hint(edge);
        /* In the locality graph, the two nodes corresponding to this
           edge are merged into
one and the remaining edges leaving each node are coalesced */
        coalesce(edge);
    }
}
```

For the colocate_hint( ) function illustrated in Table 5, the hint may be generated by locality value of the two nodes to the same value. (Table 7, below, sets forth pseudocode for at least one embodiment of a method that the scheduler 450 my employ to use the co-location hint to guide the co-location decision.) The threshold parameter for the colocate_hint function depends on the cache size, cache line size, and the inter-processor communication cost. For instance, if the machine has larger communication cost, the threshold value will be larger to encourage more co-location. From block 510, processing proceeds to block 512.

Another type of hint that may be generated by the compiler 402 at block 512 relates to "hot spots". The compiler may obtain, through profiling, information regarding long-latency events such as cache misses. A complier may also obtain profiling information regarding frequently-executed edges of a control flow graph. Each of these types of profiling information may indicate "hot spots" of a program—frequently-executed or long-latency portions of a program. The faster execution of these hot spots may lead to improved performance, particularly if the hot spot occurs on a critical thread of the multi-shredded program. As is described in further detail below, a hint about hot spots may also be taken into account by the scheduler 450 when performing workload re-balancing. From block 512, processing may proceeds to block 514.

In addition to the Locality and hot spot hint generated by the compiler, the compiler 402 may also generate at block 514 Fusion hints that may be utilized by the scheduler 450 to perform a fusing optimization. During the fusing optimization, the scheduler 450 may perform a more aggressive co-location optimization than the co-location of MUE's based on locality. For fusion, shreds are not only migrated so that they are co-located, but the computation order may be changed among dependent shreds. If the compiler can identify two MUE's separated by a synchronization mechanism, the two MUE's can potentially be "fused", and the compiler 402 can pass one or more hints to the scheduler 450 for run-time fusing.

Fusion should satisfy dependence constraints. For example, given two two-deep loop nests, the scheduler 450 may fuse the loops if: 1) the loops are conformable and 2) there is no dependence vector "<,>". Accordingly, in order to support the fusing optimization, the compiler 402 may perform fusion feasibility analysis and, based on this analysis, maintain a conformability value and a dependence value in its internal data structures (see Table 4, above).

Conformability requires that the loop bounds of different MUE's to be the same. The compiler indicates that an MUE representing a loop is conformable with another MUE representing a loop if the loop bounds of the first loop and the second loop are identical. Such information may be recorded in the internal conformability field illustrated in Table 4.

Regarding dependences, the compiler performs dependence analysis at block 514 to avoid generating a fusion hint for MUE's that would contravene dependence constraints. We say that two accesses to data by different MUE's are dependent if they refer to the same location and at least one of them is a write operation. For at least one embodiment, the compiler may determine a dependence direction vector (see, e.g., dependence field in Table 4). Each vector element corresponds to an enclosing loop. The element value can be "<", "=", ">", or unknown. A value of "=" means that an MUE depends only on itself. A value of "<" indicates that the MUE should be executed in its original order and a value of ">" indicates that the MUE should be executed in reverse order.

For example, consider a sample one-level enclosing loop. The direction vector element from access A[i] to access A[j] can be "<" if i<j. The direction vector element will be ">" if i>j. The direction vector element will be "=" if i=j. If the dependence vector for an MUE is "=", the MUE may be fused without violating dependence constraints.

The compiler 402 may, for at least one embodiment, generate a fuse hint at block 514 for a pair of MUE'S if the two MUE's are conformable and if neither MUE has a dependence vector of (<,>). The fuse hint may be generated by the compiler at block 514 according to a method illustrated by the pseudocode set forth in Table 6:

TABLE 6

Generation of Fusion Hint

```
fuse(a_compilation_unit)
{
    for each pair of MUE's {
        if (no reduction operator && no stencil operator) {
            /* Only current stream element is visible to the kernel */
            if (streams to both MUE are conformable) {
                if (no scalar code or pointer code between kernels to
                induce dependences) {
                    if (no dependence vector with (<, >)) {
                        add fuse hint for this pair of MUE's for
                        scheduler
                    }
                }
            }
        }
    }
}
```

From block 514, processing ends at block 516. The discussion now turns to the use of hints, generated by the compiler according to the method of FIG. 5, by the scheduler.

Use of Hints by the Scheduler.

Figure 6:
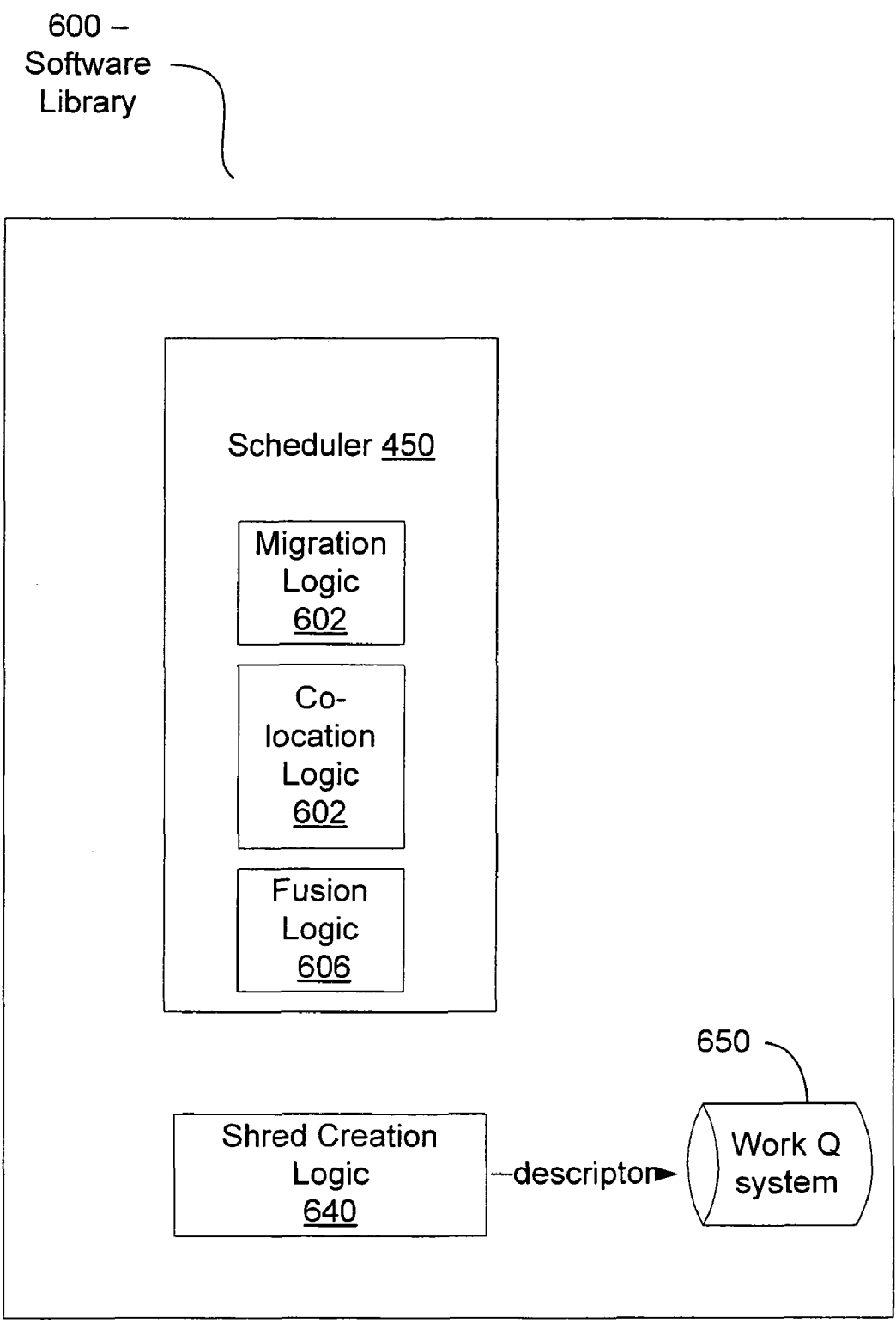
FIG. 6 is a block diagram illustrating at least one embodiment of a runtime user-level thread scheduler capable of utilizing compiler-generated hints to guide scheduling decisions.

FIG. 6, which is consulted in conjunction with FIG. 4, illustrates that the scheduler logic 450 may include logic for performing each of the runtime scheduling optimizations described in further detail below. FIG. 6 illustrates that the scheduler 450 may include migration logic 602, co-location logic 604, and fusion logic 606. FIG. 6 illustrates that the scheduler logic 450 may be part of user software 600. The embodiment of the software 600 shown in FIG. 6 is a software library, but such illustration should not be taken to be limiting. The features illustrated in FIG. 6 may reside anywhere in user space.

In addition to the scheduler 450, the software library 600 may also include shred creation software 640 that provides for creation of a shred in response to a "create" API-like user instruction such as, for example "shred_create_attr" (discussed above in connection with Table 2). For at least one embodiment, the shred creation software provides for creation of a shred by placing a shred descriptor into a work queue system 650.

The work queue system 650 may include one or more queues to maintain, for at least one embodiment, descriptors for user-defined shreds that are in line for scheduling and execution and are therefore "pending". One or more queues may be utilized to hold descriptors for shreds that are waiting for a shared resource to become available, such as a synchronization object or a sequencer. The work queue system 650, as well as the scheduler logic 450, may be implemented as software. In alternative embodiments, however, the queue system 650 and scheduler logic 450 may be implemented in hardware or may be implemented as firmware (such as microcode in a read-only memory).

FIG. 6 illustrates that any or all of the shred scheduler 450, shred creation software 640, and work queue system 650 may be implemented as part of the run-time library 600. Although illustrated herein as software logic, one of skill in the art will recognize that the functionality of the library 600 may be implemented as firmware, as a combination of firmware and software, and may even be implemented as dedicated hardware circuitry.

The run-time library 600 may create an intermediate layer of abstraction between a traditional industry standard API, such as a Portable Operating System Interface ("POSIX") compliant API, and the hardware of a multi-sequencer system that supports at least a canonical set of shred instructions. The run-time library 600 may act as an intermediate level of abstraction so that a programmer may utilize a traditional thread API (such as, for instance, PTHREADS API or WINDOWS THREADS API or OPENMP API) with hardware that supports shredding.

The scheduler 450 may perform various optimizations during runtime scheduling of shreds in an attempt to improve performance of the shredded program. Described herein are three optimizations that the scheduler 450 may perform based on the compiler-generated hints described above: Migration, Co-location and Fusion. One of skill in the art will recognize, however, that the discussion below should not be taken to be limiting. Various other optimizations may be performed, based on other hints generated by the compiler 401 and passed to the scheduler 450 via the interface 442, without departing from the scope of the claims set forth further below.

Migration. The scheduler 450 benefits from the compiler's MUE determination to perform this optimization, which is basically a workload balance optimization. The migration optimization may be performed by the migration block 602 of the scheduler 450.

Finer granularity in MUE decomposition gives greater flexibility to migrate portions of a program to separate sequencers (increase parallelism). For this optimization, the scheduler 450 may utilize uses the Imbalance hint, which is an integer value indicating the degree of computation associated with the shred. For at least one embodiment, this is accomplished by associating a "degree of computation" hint with the MUE. This hint allows the scheduler to know a value for "how much work" is involved with executing the MUE. Using this information, the scheduler 450 may perform efficient load re-balancing among the available sequencers of the system at run-time. That is, the scheduler 450 may migrate MUE's of the same original thread or shred to different sequencers in order to more efficiently increase thread level parallelism during execution, and/or may aggregate MUE's onto a single sequencer to achieve load balancing goals.

The scheduler may utilize the hotspot hint to inform its own runtime monitoring for hotspots. For example, if the scheduler receives a hotspot hint from the compiler, this indicates that compiler has determined that the particular MUE may be executed more often than others or that the compiler has determined, through profiling, that the MUE may include a long latency instruction such as a cache miss. The scheduler 450 may then add the hotspot to the list of those program addresses that it monitors as potential hotspots. Periodically (e.g., every 500 ms), the scheduler 450 may sample the program counter (PC) during runtime. If one of the monitored addresses repeatedly appears in the PC during such sampling, the scheduler 450 may treat the address as a hotspot and may make scheduling decisions accordingly. For at least one embodiment, the scheduler 450 may allocate a more powerful, faster set of sequencers for hot spot execution, or may schedule hot spots to be executed with a higher scheduling priority.

Co-location. The scheduler 450 may utilize the co-location hint generated by the compiler 402 at block 510 (FIG. 5) to perform this optimization, for which the scheduler 450 may schedule data-sharing MUE's on the same (or nearby) sequencers. The co-location optimization may be performed by the co-location block 604 of the scheduler 450.

In order to utilize the Locality hint for an MUE, the co-location block 604 of the scheduler 450 may generally perform the following: if the locality hint for a particular MUE is above a certain threshold, the scheduler accesses a locality graph to see which other MUE's the current MUE shares data with.

For at least one embodiment, the scheduler 450 may have access to the locality graph generated by the compiler 402 (see, e.g., block 508 of FIG. 5). For example, the locality graph may be stored as part of the compiler's output, in the same manner, for example, that the symbol table is stored. The co-location logic 604 of the scheduler 450 may, upon receiving the co-location hint for an MUE, determine whether the co-location hint value exceeds a predetermined threshold. If so, the scheduler 450 may look up the current MUE in the locality graph. The scheduler 450 may then traverse the locality graph to determine which other MUE's the current MUE is likely to share data with, and may make aggregation decisions accordingly.

Table 7 sets forth sample pseudocode for at least one embodiment of a scheduler routine to utilize the information provided by the compiler 402 over the interface 442 in order to guide co-location decisions. That is, once the sequencer 450 has determined, via the co-location hint and traversal of the locality graph, that shreds share a locality value, the method shown in Table 7 illustrates how the scheduler may utilize this information to guide the aggregation decision.

Figure 7:
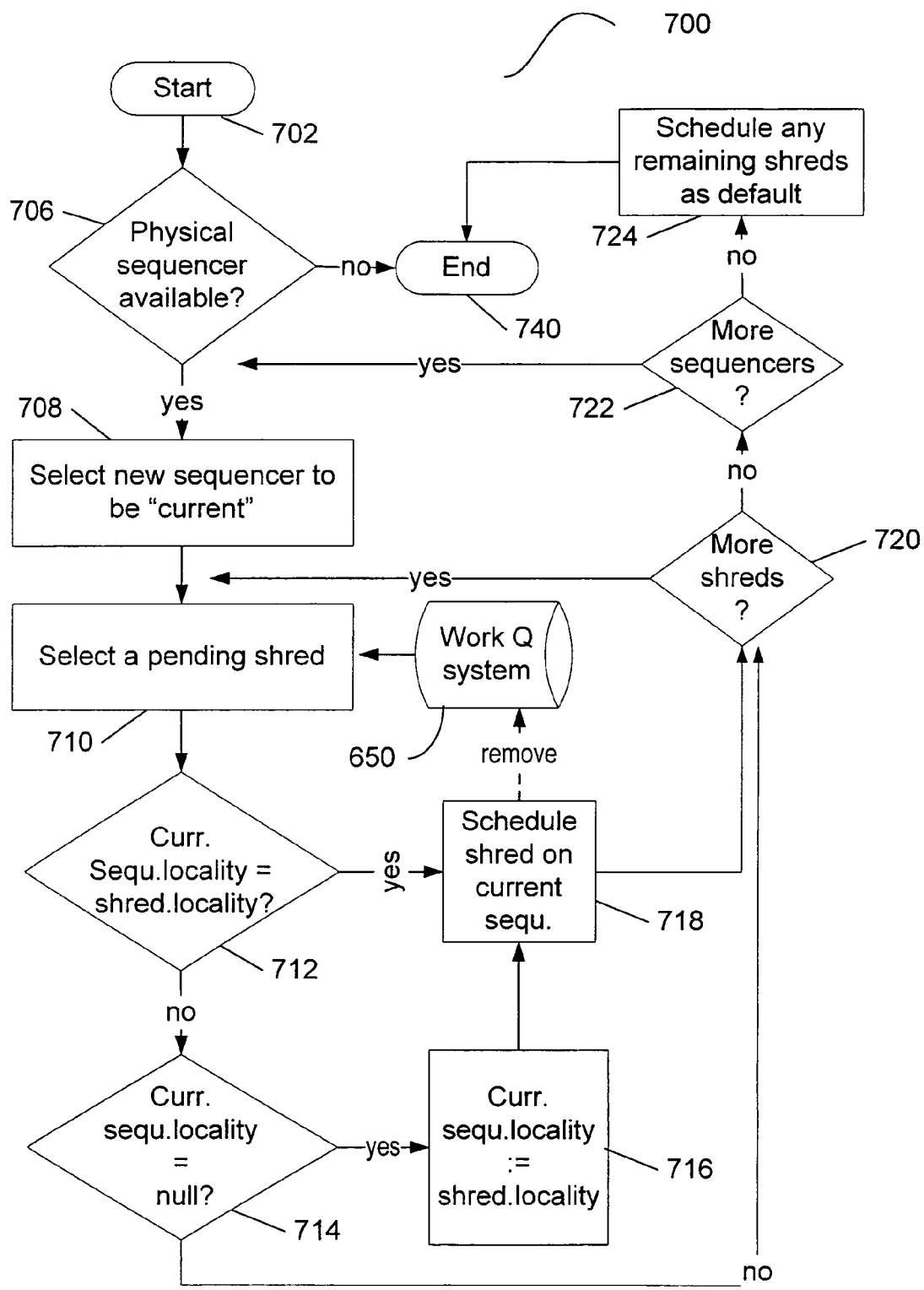
FIG. 7 is a data flow diagram illustrating at least one embodiment of method for utilizing a locality hint to guide user-level thread scheduling decisions.

FIG. 7 illustrates the method 700 of Table 7 in flowchart form. For at least one embodiment, the method 700 may be performed by the scheduler 450. More specifically, for at least one embodiment the method 700 illustrated via pseudocode in Table 7 in flowchart form in FIG. 7 may be performed by the co-location logic 604:

TABLE 7

Locality schedule algorithm

For each available sequencer p
   For each available shred
     //p.locality is a variable maintained by the scheduler to
     represent sequencer
locality
     If shred.attr.locality == p.locality
        Schedule shred on processor TABLE 7-continued Locality schedule algorithm If p.locality not set
   Schedule shred on processor
   p.locality = shred.attr.locality //If no match, then
   use default scheduling
algorithm and set p.locality to be shred.attr.locality For the simple algorithm presented in Table 7 and FIG. 7, the goal is to match threads with sequencers that most likely have data that they can use. For at least one embodiment, the Locality hint received over the interface 442 is an integer, and the value represents sharing with other shreds. For example, if two shreds have the same locality value, then they most likely have positive locality between them.

Figure 8:
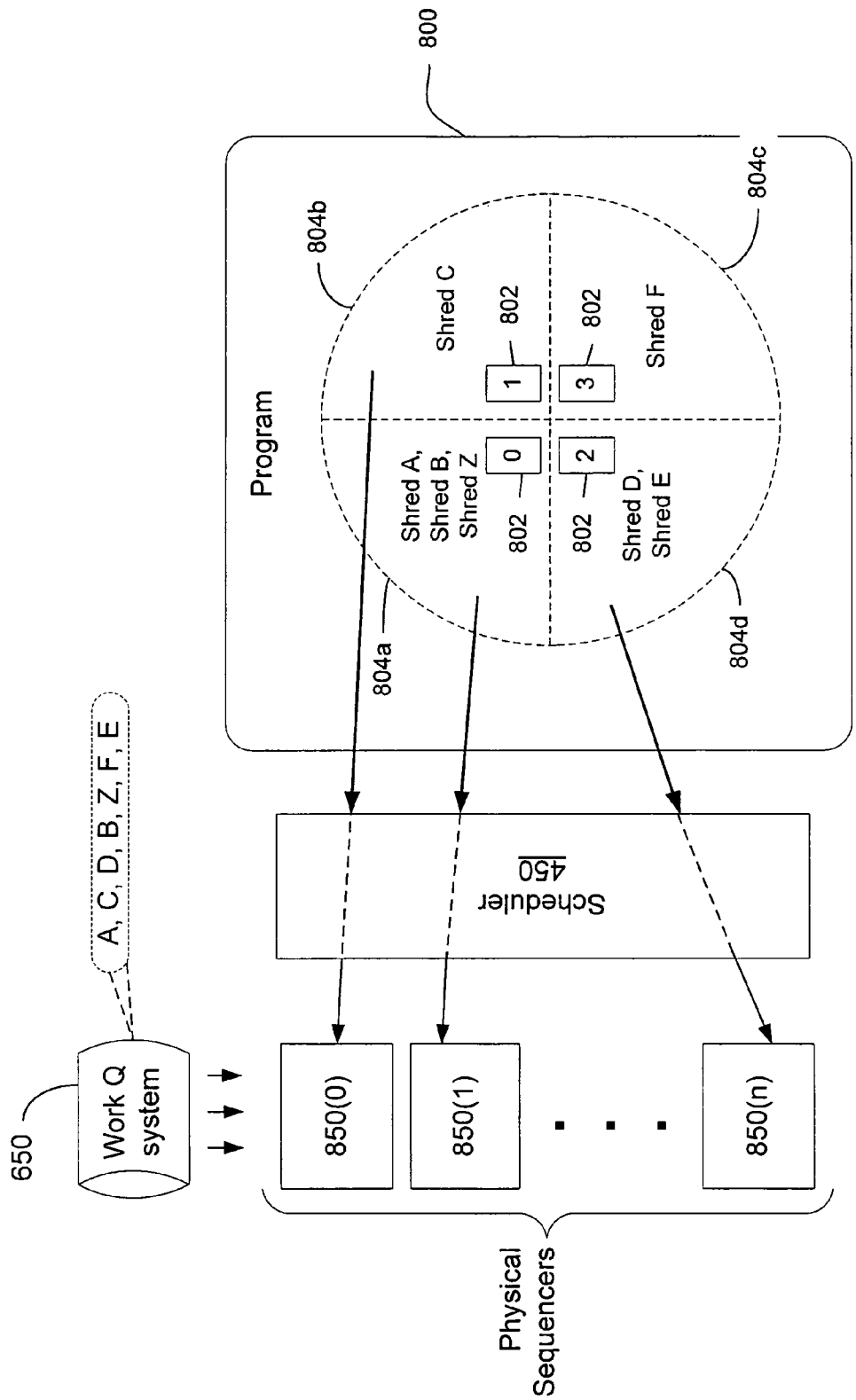
FIG. 8 is a conceptual data flow diagram illustrating an example of locality-based migration.

Turning to FIG. 8, this concept is further illustrated. FIG. 8 is discussed herein with reference to FIG. 7 as well. FIG. 8 shows that the locality variable 802 associated with an MUE is an integer. Conceptually, the compiler (see, e.g., 402 of FIG. 4) can divide the MUE's of a compilation unit 800 (such as a shredded program) into locality-sharing groups 804*a*, 804*b*, 804*c*, and 804*d*. FIG. 8 illustrates that the sample compilation unit 800 in FIG. 8 can be divided into four groups of MUE's, where shreds of each group share the same locality value. Thus, sample MUE's (virtual shreds) A, B and Z illustrated in FIG. 8 all have the same locality integer value=0. Sample MUE/shred C in group 804*b* has a locality value of 1. Sample MUE's/shreds D and E in group 804*d* have a locality value of 2. Finally, FIG. 8 shows that sample MUE/shred F in group 804*c* has a locality value of 3.

FIG. 8 illustrates that a system capable of running the program 800 may include a plurality of n physical sequencers 850(0) through 850(*n*). All of the shreds (A, B, Z) in group 804*a* have the same locality integer (0) and, therefore, performance benefits may be gained by scheduling the shreds (A, B, Z) on the same or nearby sequencers, or on sequencers that share a single cache.

Accordingly, for the method 700 illustrated in Table 7, the scheduler 450 may schedule shred A to execute on a particular sequencer 850(1) and may then schedule additional shreds (B, Z) with the same locality value to execute on the same sequencer 850(1). It should be noted that the Locality integer merely indicates a possible locality relationship among MUE's and does indicate any particular sequencer or hardware resource. The decision regarding which particular resource to be used for execution of the shreds is best made by the scheduler during runtime. Further detail about this process may be garnered from FIG. 7.

For purposes of illustration, the processing of FIG. 7 is discussed in conjunction with the example illustrated in FIG. 8. For the discussion, it is assumed that prior to performing a current iteration of the method 700, the work queue system 650 includes shred descriptors in the FIFO order illustrated in FIG. 8: A, C, D, B, Z, F, E. For at least one embodiment, it is also assumed that the locality value for each sequencer 850 has been set to a null value at powerup. However, at any particular time that the method 700 is performed, one or more of the sequencers may have previously been assigned to execute a shred having a particular locality integer value. A locality value for the sequencer, which indicates the locality of shreds that have been scheduled to execute on the sequencer, may thus have been assigned to a particular sequencer before a particular iteration of the method 700.

FIG. 7 illustrates that the processing for the method 700 begins at block 702 and proceeds to block 704. At block 704, it is determined whether any physical sequencer 850 is available for work. If so, a current physical sequencer 850 is selected at block 708. For purposes of our example, it is assumed that sequencer 850(1) is selected at the first pass of block 706. Processing then proceeds to block 710, where a "current" shred is selected from the work queue system 650. For purposes of our example, it is assumed that shred A is selected at the first pass of block 710.

Processing proceeds to block 712. For purposes of our example, it is assumed that sequencer 850(1) has not been assigned a locality value since its last initialization (at power up, restart, reset, etc). Accordingly, block 712 evaluates to false, and processing falls through to block 714. The determination at block 714 evaluates to "true" for our example. Accordingly, the locality value for sequencer 850(1) is set to the locality value (integer value of "0") for shred A at block 716. Shred A is then scheduled for execution on sequencer 850(1) at block 718, and the shred descriptor for Shred A is removed from the queue system 650. Processing then proceeds to block 720.

For our example, several shreds (C, D, B, Z, F, and E) remain in the queue system 650. Accordingly, the determination at block 720 evaluates to "true" and processing proceeds to block 710 for a second pass. At the second pass of block 710 the next shred, shred C, is selected from the work queue 650. FIG. 8 illustrates that the locality value for Shred C is an integer value of "1". However, the locality value for the current sequencer (sequencer 850(1)), was set to an integer value of "0" at the first pass of block 716. Accordingly, the determination at the second pass of blocks 712 and 714 evaluate to "false". As a result, Shred C is not scheduled on the current sequencer (sequencer 850(1)), and Shred C therefore remains in the work queue system 650.

Processing then proceeds to block 720. Because several shreds (C~~ D, B, Z, F, and E) remain in the queue system 650, the determination at block 720 evaluates to "true", and processing proceeds to block 710 for a third pass. At the third pass of block 710 the next shred, shred D, is selected from the work queue 650. Processing for Shred D, whose locality value is an integer value of "2", proceeds as that described above for Shred C. Because the locality values of Shred D and the current sequencer (850(1)) do not match, Shred D is not scheduled on the sequencer and a descriptor for Shred D remains in the work queue system 650.

Processing then proceeds to block 720. Because several shreds (~~C, D,~~ B, Z, F, and E) remain in the queue system 650, the determination at block 720 evaluates to "true", and processing proceeds to block 710 for a fourth pass. At the fourth pass of block 710 the next shred, shred B, is selected from the work queue 650. Processing then proceeds to block 712.

At block 712, the locality of Shred B is compared with the locality of the current sequencer, sequencer 850(1). FIG. 8 illustrates that the locality for both is an integer value of "0". Accordingly, the comparison at block 712 evaluates to "true" and processing proceeds to block 718. Shred B is scheduled for execution on sequencer 850(1), and the descriptor for Shred B is removed from the queue system 650. Processing then proceeds to block 720.

Because several shreds (~~C, D,~~ Z, F, and E) remain in the queue system 650, the determination at block 720 evaluates to "true", and processing proceeds to block 710 for a fifth pass. At the fifth pass of block 710 the next shred, shred Z, is selected from the work queue 650. FIG. 8 illustrates that the locality value for Shred Z is also an integer value of "0". Accordingly, Shred Z is scheduled for execution on sequencer 805(1) in the manner discussed above for Shred B. Processing then proceeds to block 720.

FIG. 8 illustrates that the locality for the remaining unconsidered shreds, Shred F and Shred E, are integer values of "3" and "2", respectively. On the $6^{th}$ and $7^{th}$ passes of the method 700, the locality of the shreds do not match the locality of the current sequencer, sequencer 850(1), which is an integer value of "0". Accordingly, neither shred is removed from the work queue 650 nor scheduled for execution. Processing for the seventh pass of the method 700 therefore proceeds to block 720. Because all pending shreds in the work queue 650 have been considered for the current sequencer, the evaluation at block 720 evaluates to "false" and processing proceeds to block 722.

At block 722, it is determined whether any additional sequencers are available for the scheduling of shreds. For our example, assume that sequencers 850(0) and 850(n) are available. Processing therefore proceeds to block 708 and the next sequencer is selected as the "current" sequencer. For our example, assume that sequencer 850(0) is selected at block 708. Processing then proceeds to block 710. At the first pass of block 710 for sequencer 850(0) in our example, the work queue system 650 includes descriptors for Shreds C, D, B, Z, F, and E.

For our example, assume that shred C is selected at the first pass of block 710 for sequencer 850(0). Processing then proceeds to block 712.

Again, it is assumed that the sequencer 850(0) has a null locality value. Accordingly, the determination at block 712 evaluates to "false" and processing falls through to block 714. For our example, the determination at block 714 evaluates to "true" for sequencer 850(0), and processing proceeds to block 716. At block 716, the locality value for sequencer 850(0) is set to the locality value (integer value "1") of shred C. Processing then proceeds to block 718. At this first pass of block 718 for sequencer 850(0), shred C is scheduled for execution on sequencer 850(0), and the shred descriptor for Shred C is removed from the work queue system 650. Processing then proceeds to block 720.

The processing described above in connection with shreds C, D, F and E in relation to sequencer 850(1) is performed on the second, third, and fourth passes of the method 700 for sequencer 850(0). That is, none of Shreds D, F or E are scheduled on sequencer 850(0) because none of them have the same locality integer as that which was assigned to sequencer 850(0). That is, the locality integer assigned to block 850(0) at block 716 is an integer value of "1", while the locality values for Shreds D, F, and E are "2", "3", and "2", respectively.

After all shreds have been considered for current sequencer 850(1), processing proceeds to block 722, where it is determined that one more sequencer, sequencer 850(n) is available for work. Accordingly, for our example sequencer 850(n) is selected as the current sequencer at block 708. Processing then proceeds to block 710.

For our example, at the first pass of method 700 for sequencer 850(n), the following shreds remain pending in the work queue system: Shreds D, F and E. As is described above, the method 700 will cycle through all remaining shreds pending in the work queue 650 in order to determine if they should be scheduled on sequencer 850(n). For our example (assuming, again, that the locality value for sequencer 850(n) is initially a null value), Shred D is scheduled on Sequencer 850(n) and is removed from the work queue system 650 at the first pass of block 718 for sequencer 850(n). At the second pass of method 700 for sequencer 850(n), Shred F will not be scheduled, and will remain in the work queue system 650. This is because the locality value for sequencer 850(n) is assigned to the locality value of Shred D, an integer value of "2", at the first pass of block 716 for sequencer 850(*n*), yet the locality value for Shred F is an integer value of "3".

For our example, only three sequencers (850(0), 850(1), and 850(*n*)), were available for work. Accordingly, when the determination at block 722 evaluates to "false" at block 722, there is still an unscheduled shred, Shred F, in the work queue system 650. FIG. 7 illustrates that such remaining shred are scheduled at block 724 according to a default method of the scheduler 450 (e.g., a FIFO scheduling method), rather than according to the locality-based method 700 illustrated in FIG. 7

One of skill in the art will note that the method illustrated in Table 7 and FIG. 7 is simply one implementation of how the scheduler 450 may use the co-location compiler hint. Other implementations may provide other types of information that the scheduler 450 may use to exploit the degree of locality and to adjust co-location decisions more aggressively. For example, for one alternative embodiment the co-location hint is not generated by the compiler. Instead, the compiler determines, and places on the interface 442, the intermediate values such as spatial locality and temporal locality (see Table 4), as well as stencil and reduction information so that the scheduler 450 may utilize the information to make co-location decisions itself. As with the other hints, of course, the scheduler is free to disregard the Locality hint. Failure to utilize the Locality hint to co-locate MUE's with locality, while it may fail to realize certain performance benefits, does not affect program correctness.

Fusion. The Fusion hint passed to the scheduler 450 over the interface indicates whether the compiler has determined that the current MUE is fusible with another MUE. As is described above, an MUE that has a non-null value for the Fusion hint has been determined by the compiler to be fusible with another MUE in that the two neighboring loop nests have no dependence vector "<,>" and the 2 loops are conformable. As with the other hints, of course, the scheduler 450 is free to disregard the fusing hint without affecting program correctness. The fusing hint generated by the compiler 402 for an MUE indicates that it is safe to fuse the MUE; the scheduler 450 is free to decide during runtime whether such fusion is desirable from a performance standpoint.

Embodiments of the runtime library discussed herein support user-level shreds for any type of multi-sequencer system. Any user-level runtime software that supports shreds, including fibers, pthreads and the like, may utilize the techniques described herein. In addition, the scheduling mechanism and techniques discussed herein may be implemented on any multi-sequencer system, including a single-core SMT system (see, e.g., 310 of FIG. 3) and a multi-core system (see, e.g., 350 of FIG. 3). Such multi-sequencer system may include both OS-visible and OS-sequestered sequencers.

For at least one embodiment, user-level shreds from the same application may run on all, or any subset, of OS-visible sequencers and/or OS-sequestered sequencers concurrently. Instead of merely sustaining a one-to-one mapping of application threads to OS threads and relying on the OS to manage the mapping between sequencers and threads, embodiments of the runtime library discussed herein may allow multiple user-level shreds in a single application image to run concurrently in a multi-sequencer system. For a single application program that is both multi-threaded and multi-shredded, embodiments of the present invention may thus support M:N thread-to-shred mapping so that N user-level shreds and M threads may execute concurrently on any or all sequencers in the system, whether OS-visible or OS-sequestered. (M, N≧1).

Such a runtime library as disclosed herein provides a contrast, for example, to systems which allow, at most, only one user-controlled "fiber" to execute per OS-visible thread. A fiber for such systems is associated with an OS-controlled thread, and two fibers from the same thread cannot be executed concurrently. For such contrasted systems, multiple user-level shreds from the same OS-controlled thread cannot execute concurrently.

For at least one embodiment of a runtime library as disclosed herein, the library (see, e.g., 600 of FIG. 6) may initiate one distinct OS thread as a dedicated service thread for each OS-visible sequencer. The service thread can be associated with one or more OS-sequestered sequencers. These OS-visible service threads may each execute an application-specific copy of the scheduler (see, e.g., 450 of FIG. 5) for its associated OS-visible sequencer. The service thread may schedule one or more shreds for execution on OS-sequestered sequencers associated with the OS-visible sequencer (see, e.g., shreds 130-132 and 134-136 associated with OS-visible threads 125 and 126, respectively, of FIG. 1). Each of the shreds may run a copy of the scheduler on an OS-sequestered sequencer.

Figure 9:
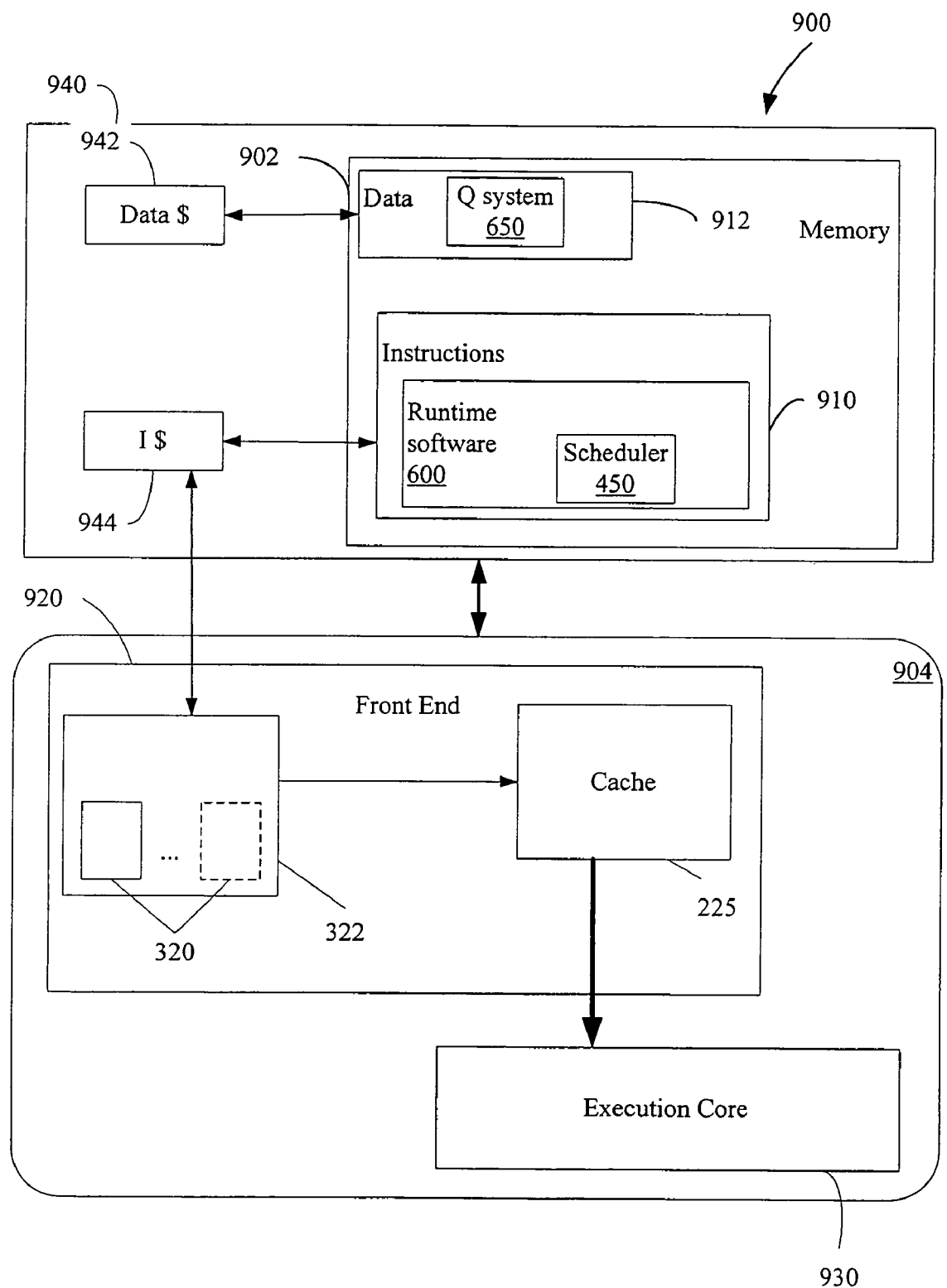
FIG. 9 is a block diagram illustrating at least one embodiment of a system capable of performing disclosed techniques.

FIG. 9 illustrates at least one sample embodiment of a computing system 900 capable of performing disclosed techniques. The computing system 900 includes at least one processor core 904 and a memory system 940. Memory system 940 may include larger, relatively slower memory storage 902, as well as one or more smaller, relatively fast caches, such as an instruction cache 944 and/or a data cache 942. The memory storage 902 may store instructions 910 and data 912 for controlling the operation of the processor 904. The instructions 910 may include a runtime library (see, e.g., 600 of FIG. 6), including a runtime scheduler 450 for user-level threads. The data 912 may include a work queue system (see, e.g., 650 of FIG. 6).

Memory system 940 is intended as a generalized representation of memory and may include a variety of forms of memory, such as a hard drive, CD-ROM, random access memory (RAM), dynamic random access memory (DRAM), static random access memory (SRAM), flash memory and related circuitry. Memory system 940 may store instructions 910 and/or data 912 represented by data signals that may be executed by processor 904. The instructions 910 and/or data 912 may include code and/or data for performing any or all of the techniques discussed herein. For example, the data 912 may include one or more queues to form a queue system 702 capable of storing shred descriptors as described above. Alternatively, the instructions 910 may include instructions to generate a queue system 702 for storing shred descriptors.

The processor 904 may include a front end 920 that supplies instruction information to an execution core 930. Fetched instruction information may be buffered in a cache 225 to await execution by the execution core 930. The front end 920 may supply the instruction information to the execution core 930 in program order. For at least one embodiment, the front end 920 includes a fetch/decode unit 322 that determines the next instruction to be executed. For at least one embodiment of the system 900, the fetch/decode unit 322 may include a single next-instruction-pointer and fetch logic 320. However, in an embodiment where each processor 904 supports multiple thread contexts, the fetch/decode unit 322 implements distinct next-instruction-pointer and fetch logic 320 for each supported thread context. The optional nature of additional next-instruction-pointer and fetch logic 320 in a multiprocessor environment is denoted by dotted lines in FIG. 9.

Embodiments of the methods described herein may be implemented in hardware, hardware emulation software or other software, firmware, or a combination of such implementation approaches. Embodiments of the invention may be implemented for a programmable system comprising at least one processor, a data storage system (including volatile and non-volatile memory and/or storage elements), at least one input device, and at least one output device. For purposes of this application, a processing system includes any system that has a processor, such as, for example; a digital signal processor (DSP), a microcontroller, an application specific integrated circuit (ASIC), or a microprocessor.

A program may be stored on a storage media or device (e.g., hard disk drive, floppy disk drive, read only memory (ROM), CD-ROM device, flash memory device, digital versatile disk (DVD), or other storage device) readable by a general or special purpose programmable processing system. The instructions, accessible to a processor in a processing system, provide for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

Sample system 900 is representative of processing systems based on the Pentium®, Pentium® Pro, Pentium® II, Pentium® III, Pentium® 4, Itanium®, and Itanium® 2 microprocessors and the Mobile Intel® Pentium® III Processor—M and Mobile Intel® Pentium® 4 Processor—M available from Intel Corporation, although other systems (including personal computers (PCs) having other microprocessors, engineering workstations, personal digital assistants and other hand-held devices, set-top boxes and the like) may also be used. For one embodiment, sample system may execute a version of the WINDOWS™ operating system available from Microsoft Corporation, although other operating systems and graphical user interfaces, for example, may also be used.

While particular embodiments of the present invention have been shown and described, it will be obvious to those skilled in the art that changes and modifications can be made without departing from the scope of the appended claims. For example, the static/off-line analysis described above may instead be implemented in a dynamic compiler, such as a Just-in-Time (JIT compiler).

Accordingly, one of skill in the art will recognize that changes and modifications can be made without departing from the present invention in its broader aspects. The appended claims are to encompass within their scope all such changes and modifications that fall within the true scope of the present invention.

What is claimed is:

1. A machine-implemented method comprising:
   receiving from a compiler scheduling hint information associated with an operating system independent user-level thread, the scheduling hint information configurable to include parallelism information associated with the user-level thread, wherein said receiving further comprises receiving the scheduling hint information via an application programming interface between the compiler and the scheduler, wherein said interface further comprises an attribute table; and
   electively taking the associated scheduling hint information into account to perform dynamic run-time scheduling for the user-level thread, wherein said scheduling for said operating system independent user-level thread is performed by a scheduler in user space.

2. The method of claim 1, wherein:
   said receiving further comprises receiving scheduling hint information for a plurality of user-level threads; and
   said interface further comprises an attribute table for each of the user-level threads.

3. The method of claim 1, wherein:
   said scheduler is to schedule said user-level thread for execution without intervention of operating system scheduling logic.

4. The method of claim 1, wherein said scheduling hint information further comprises:
   an indication that the user-level thread may be scheduled as an independent unit of execution.

5. The method of claim 4, wherein said utilizing further comprises:
   utilizing the scheduling hint information to schedule the user-level thread on a physical sequencer so as to increase parallelism of an original program.

6. The method of claim 1, wherein said scheduling hint further comprises:
   an indication that the user-level thread may be fused with another user-level thread without violating dependence constraints.

7. The method of claim 6, wherein said taking said scheduling hint information into account further comprises:
   scheduling the user-level thread and the other user-level thread for execution on a same sequencer.

8. The method of claim 6, wherein said taking said scheduling hint information into account further comprises:
   scheduling the user-level thread and the other user-level thread for execution on sequencers that are topologically adjacent to each other.

9. The method of claim 6, wherein said taking said scheduling hint information into account further comprises:
   scheduling the user-level thread and the other user-level thread for execution on two different physical sequencers that share a single cache.

10. The method of claim 1, wherein said scheduling hint information further comprises:
    an indication of the degree of locality for the user-level thread.

11. The method of claim 10, wherein said taking said scheduling hint information into account further comprises:
    scheduling another user-level thread with the same degree of locality on a same sequencer as the user-level thread.

12. The method of claim 1, wherein said scheduling hint information further comprises:
    a degree of computation indicator.

13. The method of claim 1, wherein the scheduling hint information further comprises:
    indication of a hot spot.

14. The method of claim 13, wherein said utilizing further comprises:
    utilizing the scheduling hint information to schedule the user-level thread on a physical sequencer so as to reduce the latency of the user-level thread.

15. The method of claim 1, wherein:
    said scheduling hint information is independently generated by the compiler without user input.

16. The method of claim 1, wherein:
    said taking said scheduling hint information into account further comprises determining whether a performance benefit can be gained if said information is used to guide scheduling decisions; and if not, disregarding the scheduling hint information when performing said scheduling.

17. A system, comprising:

a memory;

a runtime scheduler to schedule one or more operating system independent user-level threads, said scheduler residing in user space of said memory;

one or more thread execution units to execute said one or more operating system independent user-level threads; and an interface to pass a compiler-generated scheduling hint associated with at least one of the operating system independent user-level threads from a compiler to the scheduler, the scheduler configured to electively utilize the scheduling hint, wherein said scheduling hint information is received via an application programming interface between a compiler and a scheduler, wherein said interface further comprises an attribute table.

18. The system of claim 17, wherein runtime scheduler is further to:

utilize the scheduling hint in order to select one of the thread execution units to execute the at least one user-level thread.

19. A machine-implemented method, comprising:

performing dependence analysis on a program that includes operating system independent user-level threads;

decomposing the program into independent units of work associated with the operating system independent user-level threads; and statically generating, without utilizing user-provided pragmatic information, one or more scheduling hints to be associated with at least one of the independent units of work, and providing the scheduling hints to a runtime scheduler configured to electively utilize provided scheduling hints, wherein said scheduling hint information is received via an application programming interface between a compiler and a scheduler, wherein said interface further comprises an attribute table.

20. The method of claim 19, further comprising:

generating code to update at least one of the scheduling hints during execution of the program.

21. An article comprising a non-transitory machine-accessible medium having a plurality of machine accessible instructions, wherein, when the instructions are executed by a processor, the instructions cause the processor to perform a method, comprising:

performing dependence analysis on a program that includes operating system independent user-level threads;

decomposing the program into independent units of work associated with the operating system independent user-level threads; and statically generating, without utilizing user-provided pragmatic information, one or more scheduling hints to be associated with at least one of the independent units of work, and generating compiled code for the program that includes instructions to provide the scheduling hints to a runtime scheduler configurable to electively utilize the scheduling hints, wherein said scheduling hint information is received via an application programming interface between a compiler and a scheduler, wherein said interface further comprises an attribute table.

22. The article of claim 21, further comprising additional machine accessible instructions, wherein, when the instructions are executed by a processor, the instructions further cause the processor to:

generate a graph to represent locality among the independent units of work.

23. A method for a machine having an associated operating system, comprising:

receiving from a compiler static scheduling hint information associated with a user-level thread invisible to the operating system, the static scheduling hint information configurable to include parallelism information associated with the user-level thread, wherein said scheduling hint information is received via an application programming interface between a compiler and a scheduler, wherein said interface further comprises an attribute table; and electively taking the associated static scheduling hint information into account to perform dynamic run-time scheduling for the user-level thread invisible to the operating system by a scheduler operating in user space.

24. The method of claim 23 wherein the user-level thread invisible to the operating system comprises a shred.

* * * * *